United States Patent
Tang et al.

(10) Patent No.: US 11,926,049 B2
(45) Date of Patent: Mar. 12, 2024

(54) NUCLEAR EMERGENCY MULTIFUNCTIONAL OPERATION ROBOT

(71) Applicant: University of South China, Hengyang (CN)

(72) Inventors: Dewen Tang, Hengyang (CN); Shuliang Zou, Hengyang (CN); Wei Wang, Hengyang (CN); Weiwei Xiao, Hengyang (CN); De Zhang, Hengyang (CN); Jun Liu, Hengyang (CN); Qian Deng, Hengyang (CN)

(73) Assignee: University of South China, Hengyang (CN)

( * ) Notice: Subject to any disclaimer, the term of this patent is extended or adjusted under 35 U.S.C. 154(b) by 421 days.

(21) Appl. No.: 17/469,058

(22) Filed: Sep. 8, 2021

(65) Prior Publication Data
US 2022/0072699 A1    Mar. 10, 2022

(30) Foreign Application Priority Data
Sep. 9, 2020   (CN) .......................... 202010942668.3

(51) Int. Cl.
| | |
|---|---|
| *B62D 55/084* | (2006.01) |
| *B25J 5/00* | (2006.01) |
| *B25J 9/00* | (2006.01) |
| *B25J 9/10* | (2006.01) |
| *B25J 9/14* | (2006.01) |
| *B25J 9/16* | (2006.01) |
| *B25J 13/08* | (2006.01) |
| *B25J 19/00* | (2006.01) |

(52) U.S. Cl.
CPC ............. *B25J 9/0009* (2013.01); *B25J 5/005* (2013.01); *B25J 9/102* (2013.01); *B25J 9/144* (2013.01); *B25J 9/1697* (2013.01); *B25J 13/086* (2013.01); *B25J 19/0025* (2013.01)

(58) Field of Classification Search
CPC ........ B25J 9/0009; B25J 9/144; B25J 13/086; B62D 55/065
See application file for complete search history.

(56) References Cited

U.S. PATENT DOCUMENTS

| | | | | |
|---|---|---|---|---|
| 5,248,008 | A * | 9/1993 | Clar | ...................... B60K 7/0007 180/9.5 |
| 2015/0258682 | A1* | 9/2015 | Izikevich | ................. B25J 9/104 74/490.01 |

* cited by examiner

*Primary Examiner* — Muhammad S Islam
(74) *Attorney, Agent, or Firm* — Greenberg Traurig, LLP; David J. Dykeman; Peigen Jiang

(57) ABSTRACT

A nuclear emergency multifunctional operation robot includes a base, a mechanical arm, a tool change-over device, and motion supporting devices. The base includes a pedestal, a mounting seat A, a mounting seat B, a mounting seat C, a rotation driving mechanism A, and a rotation driving mechanism B. The front end of the mechanical arm is connected to the mounting seat B; the tool change-over device includes a male connector and a female connector which are abutted with or separated from each other; and the motion supporting devices are used to drive the nuclear emergency multifunctional operation robot to move. The present disclosure has the advantages that the base can be integrated with various end tools, so that the operation robot conveniently changes over tools according to operation needs to conduct various types of operations.

20 Claims, 22 Drawing Sheets

NUCLEAR EMERGENCY MULTIFUNCTIONAL OPERATION ROBOT

CROSS REFERENCE TO RELATED APPLICATION(S)

This patent application claims the benefit and priority of Chinese Patent Application No. 202010942668.3, filed on Sep. 9, 2020, the disclosure of which is incorporated by reference herein in its entirety as part of the present application.

TECHNICAL FIELD

The present disclosure relates to the technical field of nuclear emergency equipment, in particular, a nuclear emergency multifunctional operation robot.

BACKGROUND ART

With the rapid development of the nuclear power industry, the requirements for nuclear safety are also increasing day by day, and the need for the research and development of emergency response robots for nuclear power plants has gradually become prominent. The radiation resistance of electrical components involved in the emergency robots for the nuclear power plants, the radiation resistance of robot systems, the system reliability, and the functional diversification are all key and difficult points in the design of the emergency robots.

In an emergency case of a nuclear power plant, accidents that occur in a nuclear radiation environment have a greater radiation risk, and nuclear emergency robots are especially required to participate in various rescue tasks. Nuclear emergency robots can replace operators and take measures in response to nuclear facility emergencies (such as cutting, welding, and drilling operations). Due to the complex on-site facilities and surrounding environmental conditions of the nuclear power plant, many requirements are put forward for the design of the nuclear emergency robots.

The difficulties in the design of the nuclear emergency robots are as follows:
1. Due to the limitation of entrance and passage sizes on site, the miniaturization and folding performance of the robot must be considered to facilitate safe passage through a narrow space.
2. A ground clearance height of a pedestal should not be too low or too high. A too low pedestal is easily scratched by debris on the ground, and a too high pedestal is unfavorable for the size minimization and stability of the robots.
3. In order to meet the needs of complex site facilities and the surrounding environment in the nuclear power plant, the robot should have the ability to cross an obstacle, climb slopes and quickly switch operations among multiple types of work.

R&D personnel have been committed all along to the research and development of nuclear emergency robot systems that meet the above needs, but there is currently no nuclear emergency robot on the market that meets the above design needs.

SUMMARY

The present disclosure aims to overcome the shortcomings in the existing technology, and provides a nuclear emergency multifunctional operation robot, which fully meets the requirements of a nuclear emergency robot for size miniaturization, folding performance, ground clearance height of pedestal, obstacle crossing performance, and quick switching of operations among multiple types of work.

The technical solution of the present disclosure is that: a nuclear emergency multifunctional operation robot includes a base, a mechanical arm, a tool change-over device, and motion supporting devices.

The base includes a pedestal, a mounting seat A, a mounting seat B, a mounting seat C, a rotation driving mechanism A, and a rotation driving mechanism B. The mounting seat A is fixedly mounted at the upper end of the pedestal, and the front and rear ends of the mounting seat A are respectively provided with a front mounting region and a rear mounting region; the mounting seat B and the mounting seat C are movably mounted in the front mounting region and the rear mounting region respectively; the mounting seat C is provided with a plurality of placement cavities; the rotation driving mechanism A is mounted between the pedestal and the mounting seat B to drive the mounting seat B to rotate in a horizontal direction; and the rotation driving mechanism B is mounted between the pedestal and the mounting seat C to drive the mounting seat C to rotate in the horizontal direction.

The mechanical arm is movably mounted on the mounting seat B.

The tool change-over device includes a male connector and a female connector which are abutted with or separated from each other; the male connector is connected to the rear end of the mechanical arm; and the female connector is used to connect an end tool.

The motion supporting device is mounted on both sides of the front end and both sides of the rear end of the pedestal, and is used to drive the nuclear emergency multifunctional operation robot to move.

A further technical solution of the present disclosure is that a motor mounting hole A and a motor mounting hole B are formed in the pedestal; both sides of the front end and both sides of the rear end of the pedestal are respectively provided with mounting gaps A used to mounting the motion supporting devices.

The front mounting region of the mounting seat A is an arc-shaped gap formed in the front end of the mounting seat A and running through the mounting seat A from top to bottom; and the rear mounting region of the mounting seat A is a mounting hole formed in the rear end of the mounting seat A and running through the mounting seat A from top to bottom.

The mounting seat B is cylindrical and adapts to the radian of the front mounting region; a mounting gap B for mounting the mechanical arm is formed in the mounting seat B; and the bottom of the mounting gap B is provided with a sliding rail.

The mounting seat C is cylindrical and adapts to the pore diameter of the rear mounting region; the placement cavities include, from top to bottom in sequence, an upper placement cavity for placing the female connector and a lower placement cavity for accommodating the end tool connected with the female connector; the upper placement cavity is provided with an opening in the upper end of the mounting seat C; and all the placement cavities are uniformly distributed in a ring shape around a center line of the mounting seat C.

The rotation driving mechanism A includes a motor A, a driving gear, a rotating shaft A, and a driven gear. The motor A is fixedly mounted in the motor mounting hole A of the pedestal; the driving gear is fixedly mounted on a crankshaft of the motor A; the rotating shaft A is vertically arranged and rotatably mounted on the pedestal; the upper end of the rotating shaft A is fixedly connected to the lower end of the mounting seat B; the driven gear is fixedly mounted on the rotating shaft A and engaged with the driving gear; power of the motor A is transmitted to the mounting seat B through the driving gear, the driven gear and the rotating shaft A to drive the mounting seat B to rotate.

The rotation driving mechanism B includes a motor B, a driving pin wheel, a rotating shaft B and a driven sheave; the motor B is fixedly mounted in the motor mounting hole B of the pedestal; a center hole A is provided in the middle of the driving pin wheel; a round pin is fixedly connected to the end surface; a side wall surface is provided with locking convex arcs; the driving pin wheel is fixedly mounted on a crankshaft of the motor B through the center hole A; the rotating shaft B is vertically arranged and rotatably mounted on the pedestal; the upper end of the rotating shaft B is fixedly connected to the lower end of the mounting seat C; a center hole B is provided in the middle of the driven sheave; a plurality of sections of locking concave arcs are arranged on the side wall surface; all the locking concave arcs are uniformly distributed inn a ring around the central hole B; an insertion slot for the round pin to insert is arranged between adjacent locking convex arcs; the driven sheave is fixedly mounted on the shaft B through the center hole B, and is fitted with the locking convex arcs of the driving pin wheel through the locking concave arcs; power of the motor B is transmitted to the mounting seat C through the driving pin wheel, the driven sheave and the rotating shaft B to drive the mounting seat C to intermittently rotate.

A further technical solution of the present disclosure is that the mechanical arm includes an arm A, a rotating shaft A, a first rotating mechanism, an arm B, a rotating shaft B, a second rotating mechanism, and an end connecting mechanism.

The arm A is rotatably mounted in the mounting gap B of the mounting seat B at the rear end through the rotating shaft A, and a strip-shaped slot is provided on the arm A; and the strip-shaped slot extends from the front end of the arm A to the rear end of the arm A.

The first rotating mechanism includes a sliding block A, a hydraulic cylinder A and a hydraulic cylinder B; the sliding block A is movably mounted in a sliding rail at the bottom of the mounting gap B; a cylinder body of the hydraulic cylinder A is fixedly mounted in the mounting gap B of the mounting seat B; a piston rod of hydraulic cylinder A is connected to sliding block A; the piston rod of hydraulic cylinder A expands and contracts to drive the sliding block A to do reciprocating movement along the sliding rail; a cylinder body of hydraulic cylinder B is hinged with sliding block A; a piston rod of the hydraulic cylinder B is hinged to the arm A; and the piston rod of the hydraulic cylinder B expands and contracts to drive arm A to rotate around the rotating shaft A.

The arm B is rotatably mounted in the strip-shaped slot of the front end of the arm A at the rear end through the rotating shaft B.

The second rotating mechanism includes a hydraulic cylinder C and a four-connecting-rod mechanism; the four-connecting-rod mechanism includes two diamond-shaped frameworks and one connecting rod. Each diamond-shaped framework includes a first rod, a second rod and a third rod; the lower ends of the first rod and the second rod are respectively hinged to both ends of the third rod. The two diamond-shaped frameworks are symmetrically arranged in the strip-shaped slot of the front end of the arm A. The upper ends of the second rods of the two diamond-shaped frameworks are hinged to both ends of the rotating shaft B respectively. The upper ends of the first rods of the two diamond-shaped frameworks are hinged to both sides of the arm B; two ends of the connecting rod are respectively hinged to the hinge joints of the first rods and the third rods of two diamond-shaped frameworks; a cylinder body of the hydraulic cylinder C and the arm A are hinged and located in the strip-shaped slot of the arm A; a piston rod of hydraulic cylinder C is hinged to the connecting rod; the piston rod of hydraulic cylinder C expands and contracts to drive the arm B to rotate around the rotating shaft B.

The end connecting mechanism includes a connecting frame and a hydraulic cylinder D; the connecting frame is provided with a first hinge part, a second hinge part, and a third hinge part; the connecting frame is hinged to the front end of the arm B through the first hinge part; a cylinder body of the hydraulic cylinder D is hinged to the front end of the arm B; a piston rod of the hydraulic cylinder D is hinged to the second hinge part of the connecting frame; the piston rod of the hydraulic cylinder D expands and contracts to drive the connecting frame to rotate around the first hinge part, so that the third hinge part of the connecting frame moves along an arc-shaped track.

A further technical solution of the present disclosure is that the rear end of the arm A is provided with an arc-shaped curved section; the arc-shaped curved section makes the front and rear sides of the arm A respectively formed into a convex arc surface and a concave arc surface; the strip-shaped slot of the arm A is formed in one side surface with the convex arc surface; the arm B includes a rear section rod, a front section rod, and a hydraulic cylinder E; the rear section rod and the front section rod are respectively located at the rear end and the front end of the arm B and are movably sleeved with each other; a cylinder body of the hydraulic cylinder E is mounted on the rear section rod; a piston rod of the hydraulic cylinder E is mounted on the front section rod; and the piston rod of the hydraulic cylinder E expands and contracts to drive the arm B to expand or contract.

A further technical solution of the present disclosure is that the motion supporting device includes a hydraulic motor A, a hydraulic motor B, a telescopic sleeve, a supporting shell, a wheel and caterpillar band assembly and a driving assembly; the hydraulic motor A is mounted in the mounting gap A of the pedestal, and a rotating shaft of the hydraulic motor A vertically downwards extends out; the hydraulic motor B is fixedly connected to the rotating shaft of the hydraulic motor A, and a rotating shaft of the hydraulic motor B extends out in the horizontal direction; the telescopic sleeve includes a front section sleeve, a rear section sleeve and a hydraulic cylinder F; the front section sleeve is fixedly connected to the rotating shaft of the hydraulic motor B; the rear section sleeve and the front section sleeve are movably sleeved; the hydraulic cylinder F is mounted between the front section sleeve and the rear section sleeve to drive the telescopic sleeve to expand or contract; the supporting shell is welded and fixed on the rear section sleeve; the wheel and caterpillar band assembly includes a first wheel, a first axle, a second wheel, a second axle, and a caterpillar band; the first wheel is fixedly mounted on the first axle; the second wheel is fixedly mounted on the second axle; the first axle and the second axle are rotatably mounted on the supporting shell respectively; the caterpillar band is wound between the first wheel and the second wheel; the driving assembly includes a motor C, a gear A, a gear B, a gear C, a gear shaft A, a gear shaft B, a gear D and a gear E; the motor C is fixedly mounted on the supporting shell;

the gear A is fixedly mounted on the crankshaft of the motor A; the gear B and the gear C are fixedly mounted on the gear shaft A and the gear shaft B respectively and are located on two sides of the gear A and engaged with the gear A; the gear D and the gear E are fixedly mounted on the first axle and the second axle respectively and are engaged with the gear B and the gear C respectively.

A further technical solution of the present disclosure is that an inner side surface of the caterpillar band is provided with antiskid teeth; a circle of positioning slot for embedding the caterpillar band is formed in the middle parts of the outer circular surfaces of the first wheel and the second wheel; an antiskid tooth slot for embedding the antiskid teeth is formed in the positioning slot; when the caterpillar band is embedded into the positioning slot of the first wheel and the second wheel, the outer side surface of the caterpillar band is flush with the outer circular surfaces of the first wheel and the second wheel; and the antiskid teeth on the inner side surface of the caterpillar band are engaged with the antiskid tooth slot of the first wheel and the second wheel.

A further technical solution of the present disclosure is that the male connector includes a shell A, an electromagnet, a card, a card rotating shaft, and a card control mechanism.

An accommodating cavity A is formed in the shell A; the shell A is provided with a card mounting hole communicating to the accommodating cavity A; one end of the shell A is a female connector connecting end, and the other end is a mechanical arm connecting end; the mechanical arm connecting end is provided with two oppositely disposed connecting lugs; the two connecting lugs are respectively provided with fourth hinge parts and fifth hinge parts; the fourth hinge parts of the two connecting lugs are opposite to each other; the fifth hinge parts of the two connecting lugs are opposite to each other; the shell A is hinged to the front end of the arm B through the fourth hinge parts, and is hinged to the third hinge part of the connecting frame through the fifth hinge parts; the electromagnet is fixedly mounted on the female connector connecting end; the card is rotatably mounted in a card mounting hole of the shell A through the card rotating shaft; the outer side surface of the card faces the exterior of the shell A, and the inner side surface of the card faces the accommodating cavity A of the shell A; the card control mechanism is arranged in the accommodating cavity A of the shell A and is associated with the card to control the card to rotate around the card rotating shaft, so that the card is switched between an expanding state and a contracting state.

The female connector includes a shell B and an iron plate; an accommodating cavity B is formed in the shell B; the accommodating cavity B adapts to the appearance of the shell A; a card positioning pit for embedding the card that is in the expanding state is formed in the accommodating cavity B; one end of the shell B is provided with an insertion port communicating to the accommodating cavity, and the other end is provided with a mounting surface for connecting the end tool; and the iron plate is fixedly arranged at the bottom of the accommodating cavity B of the shell B.

When the male connector is abutted with the female connector, the shell A of the male connector extends into the accommodating cavity B of the female connector, the card of the male connector is in the expanding state and embedded into the card positioning pit of the female connector, and the electromagnet of the male connector directly faces and contacts the iron plate of the female connector.

A further technical solution of the present disclosure is that the shell A is of a quadrangular prism shape; the axial section size from the mechanical arm connecting end to the female connector connecting end gradually decreases; and the card mounting holes are formed in the four side walls of the shell A. Correspondingly, the accommodating cavity B of the female connector is of a quadrangular prism shape with a large upper part and a small lower part. Four cards are provided.

A further technical solution of the present disclosure is that the card control mechanism includes a bracket, a two-fold rod, a gear shaft C, a turntable, a transmission rod, a gear F, a gear G, and a motor D. The bracket is fixedly mounted at the bottom of the accommodating cavity A of the shell A, and a slideway is formed in the bracket; the two-fold rod includes a first section and a second section which are hinged to each other; the first section is slidably mounted in the slideway of the bracket; the second section is hinged to the inner side surface of the card; the gear shaft C is rotatably mounted on the bracket; the turntable is fixedly connected to the gear shaft C and is located at the upper end of the slideway of the bracket; an arc-shaped track limiting hole is formed in the turntable; one end of the transmission rod is fixedly connected to the first section of the two-fold rod, and the other end extends out from the track limiting hole of the turntable; the gear F is fixedly connected to the gear shaft C; the gear G is fixedly connected to the crankshaft of the motor D; the motor D is fixedly mounted on the bracket; power of the motor D is transmitted to the first section of the two-fold rod through the gear G, the gear F, the gear shaft, the turntable, and the transmission rod to drive the first section of the two-fold rod to move along the slideway of the bracket, so that the card is pushed by the second section to rotate around the card rotating shaft, and the card is switched between the expanding state and the contracting state.

A further technical solution of the present disclosure is that a sensor assembly is further included. The sensor assembly includes a laser proximity sensor A, a camera, a laser proximity sensor B and an inclination sensor; the laser proximity sensor A is arranged at the lower end of the pedestal; the camera is mounted on the mounting seat A; the laser proximity sensors B are mounted on two side walls of the mounting seat A; and the inclination sensors are mounted on both sides of the front end and both sides of the rear end of the mounting seat A.

Compared with the prior art, the present disclosure has the following advantages.

1. The entire operation robot uses a modularized design, which is convenient for quick maintenance, replacement of components, cleaning and decontamination. The base can be integrated with various end tools, so that the operation robot changes over the tools according to an operation need to conduct various types of operations. The mechanical arm has good folding performance, so that the operation robot passes through a relatively narrow location in an operation environment. The male connector and the female connector of the tool change-over device can be quickly abutted or separated, so that the operation robot quickly changes over the tools to conduct the various types of operations. In one aspect, the motion supporting device combines the characteristics of high traveling speed of wheels, steady traveling of the caterpillar band, and good climbing and obstacle crossing performance of the caterpillar band; in another aspect, the motion supporting device can rotate on a horizontal plane to cross an obstacle on a traveling route or to improve the stability during operation; and in a further aspect, the motion supporting device can rotate on a vertical plane to partially or overall increase the ground clearance of the pedestal of the operation robot, so as to cross an obstacle that is higher than the ground clearance of the pedestal on the traveling route.

2. The base provides a necessary structural support for the installation of all the components on the operation robot. The mounting seat A is used to carry and install all the types of components of the robot; the mounting seat B is used to install the mechanical arm; the mounting seat C is used to carry a plurality of end tools; and the rotation driving mechanism A and the rotation driving mechanism B respectively drive the mounting seat B and the mounting seat C to rotate. Based on the structure of the base, the robot supports quick change-over of the end tools on the operation site, which assists the nuclear emergency multifunctional operation robot in realizing quick change-over of multiple types of work under a nuclear emergency scenario.

3. The mechanical arm is connected to the mounting seat B at the front end, is connected to the end tool at the rear end through the tool change-over device, and is used to control a spatial position of the end tool. The arm A is driven by the hydraulic cylinder B of the first rotating mechanism to rotate. Since the position of the cylinder body of the hydraulic cylinder B is movable in the horizontal direction, an extreme angle of upward rotation of the arm A is larger. The rear end of the arm A is provided with the arc-shaped curved section, so that when the arm A upwards rotates to an extreme position, the front end of the arm A is lower and is closer to the rear end of the pedestal. The arm A is provided with the strip-shaped slot for embedding part of the arm B, so that an extreme angle of downward rotation of the arm B is larger. The arm B is driven by the hydraulic cylinder C of the second rotating mechanism to rotate. The arm B is driven by the hydraulic cylinder C through the four-connecting-rod mechanism. Since the four-connecting-rod mechanism is added, the extreme angle of downward rotation of the arm B is larger. Based on the above-mentioned four structural features, the mechanical arm has better folding performance. The mechanical arm has lower arching height in a folded state, and the gravity center of the mechanical arm is relatively closer to the gravity center of the operation robot.

4. The tool change-over device is arranged between the mechanical arm and the end tool and is used to control the end tool and the mechanical arm to be quickly connected or separated, which provides a structural support for quick change-over of various operation functions of the operation robot. When the male and female connectors are abutted, the male connector is controlled to be inserted into the accommodating cavity B of the female connector; the card of the male connector is then controlled to extend out; the electromagnet is controlled to be electrified; and the abutting between the male and female connectors is completed. When the male and female connectors are separated, the card of the male connector is controlled to contract, and the electromagnet is controlled to be electrified, so that the separation of the male and female connectors is completed. The abutting and separating steps are simple and quick, and have low accuracy requirements.

5. The motion supporting devices are mounted on both sides of the front end and both sides of the rear end of the pedestal; each motion supporting device can independently run and can realize the following actions: horizontally rotating to the outer side of a chassis under the driving of the hydraulic motor A, moving towards a direction away from the chassis under the driving of the telescopic sleeve, vertically downward rotating under the driving of the hydraulic motor B, and driving the robot to move under the driving of the driving assembly. Combining different actions can greatly expand the application range of the robot and improve the adaptability of the robot to a complex site.

6. The wheel and caterpillar band assembly of the motion supporting device integrates the wheels with the caterpillar band. In one aspect, the caterpillar band is embedded into the positioning slot of the first wheel and the second wheel to avoid axial slippage; and in another aspect, the caterpillar band is engaged with the antiskid tooth slot on the first wheel and the second wheel through the antiskid teeth to avoid relative slippage. The wheels and the caterpillar band of the wheel and caterpillar band assembly simultaneously contact the ground, and the characteristic of the wheels of high traveling speed and the characteristic of the caterpillar band of good obstacle crossing and climbing performance are combined.

The present disclosure is further described below in combination with the drawings and the embodiments.

Figure 1:
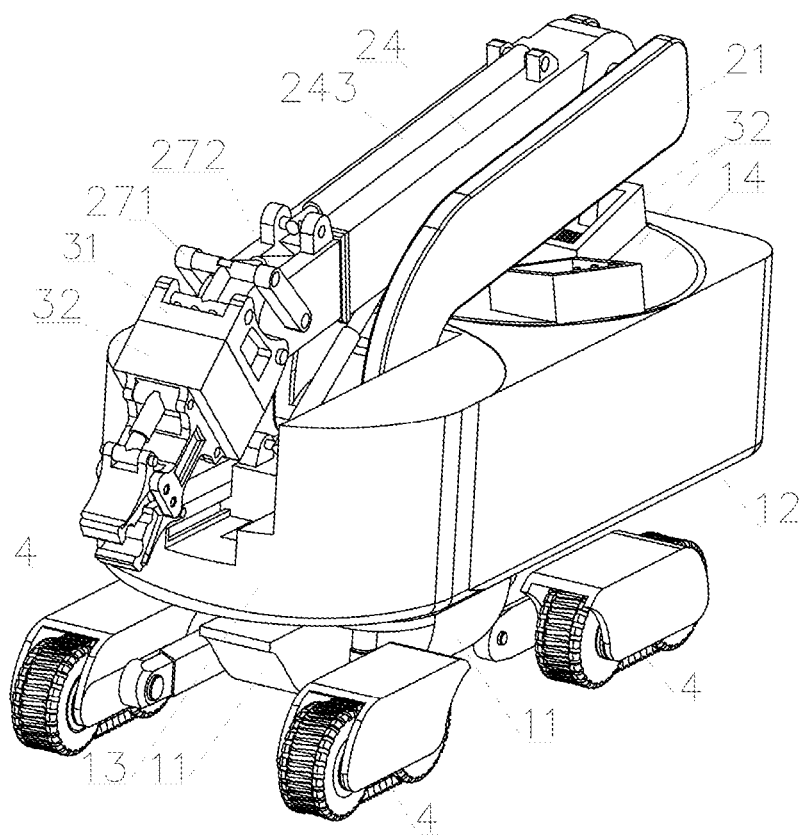
FIG. 1 is a schematic structural diagram of the present disclosure.
Figure 2:
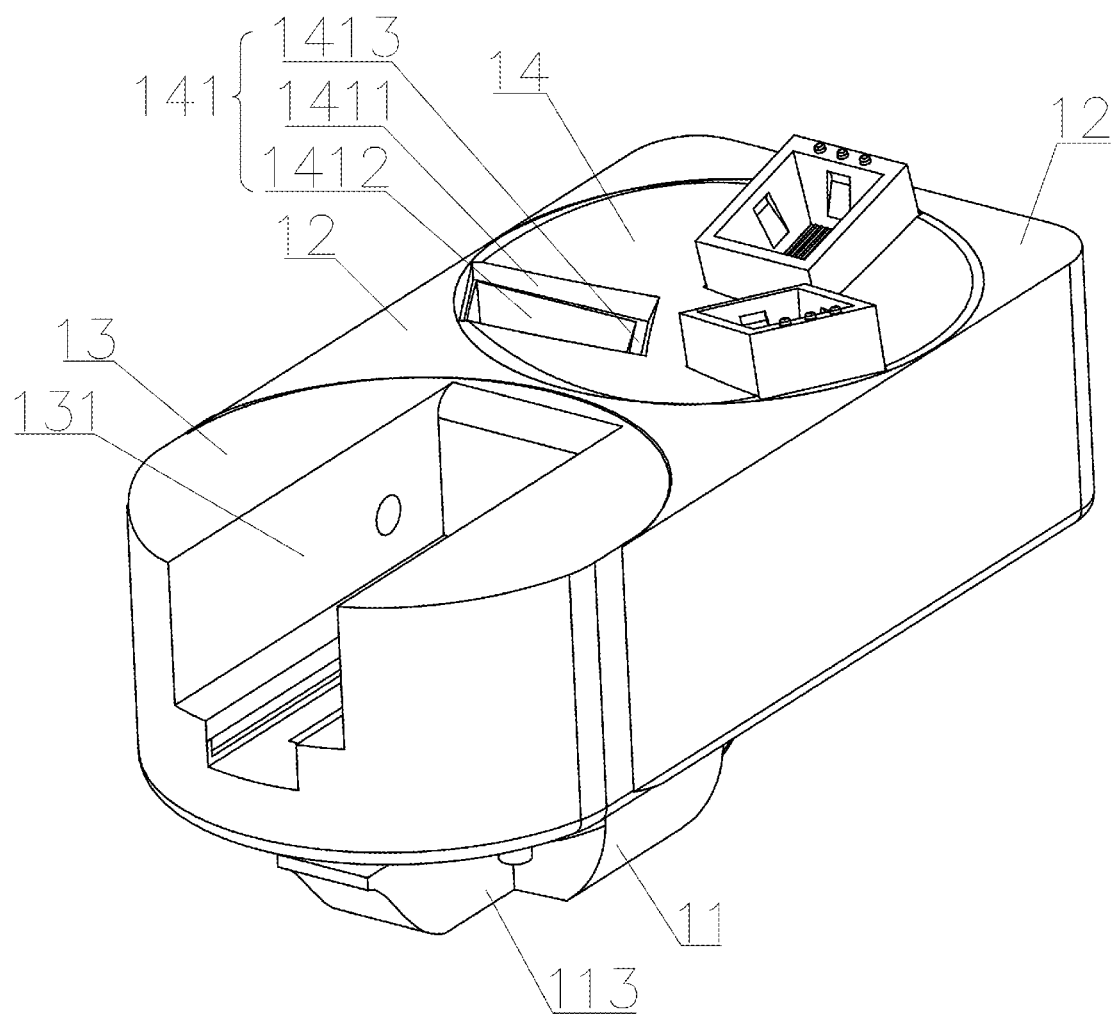
FIG. 2 is a schematic structural diagram of a base.
Figure 3:
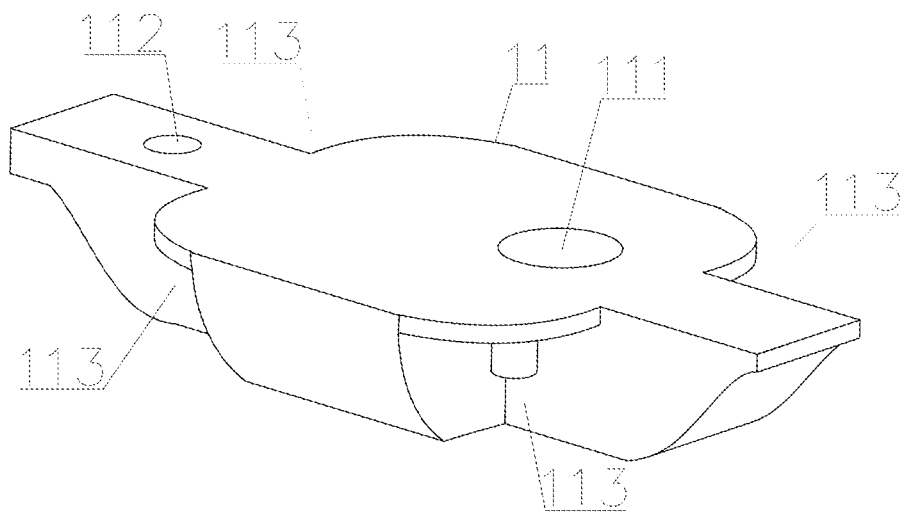
FIG. 3 is a schematic structural diagram of a pedestal in the base.
Figure 4:
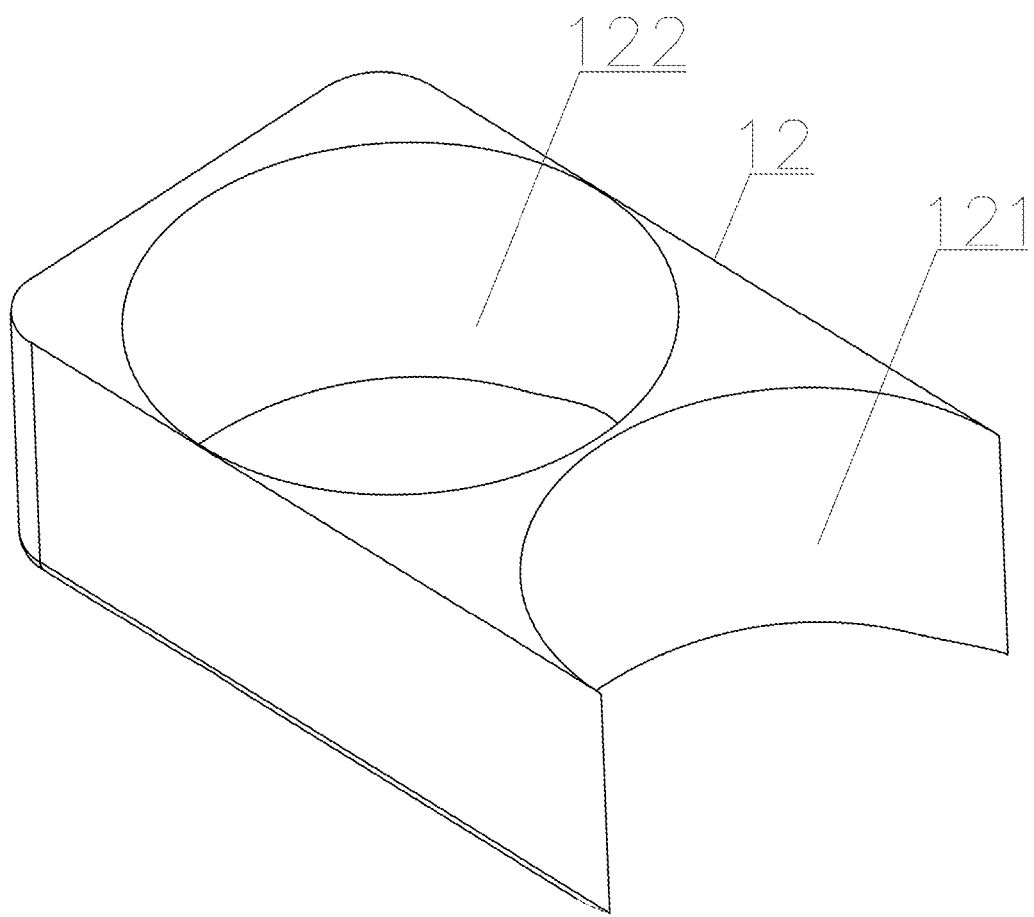
FIG. 4 is a schematic structural diagram of a mounting seat A in the base.
Figure 5:
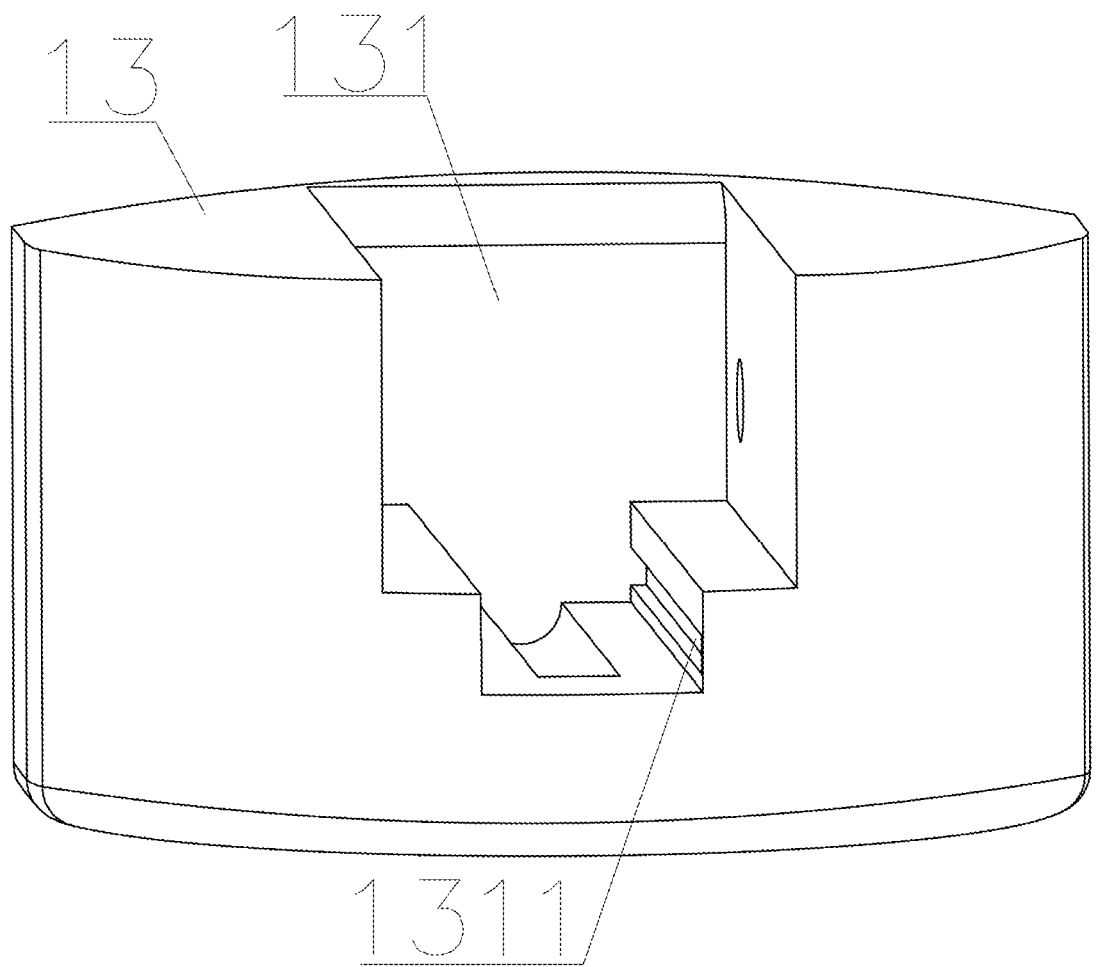
FIG. 5 is a schematic structural diagram of a mounting seat B in the base.
Figure 6:
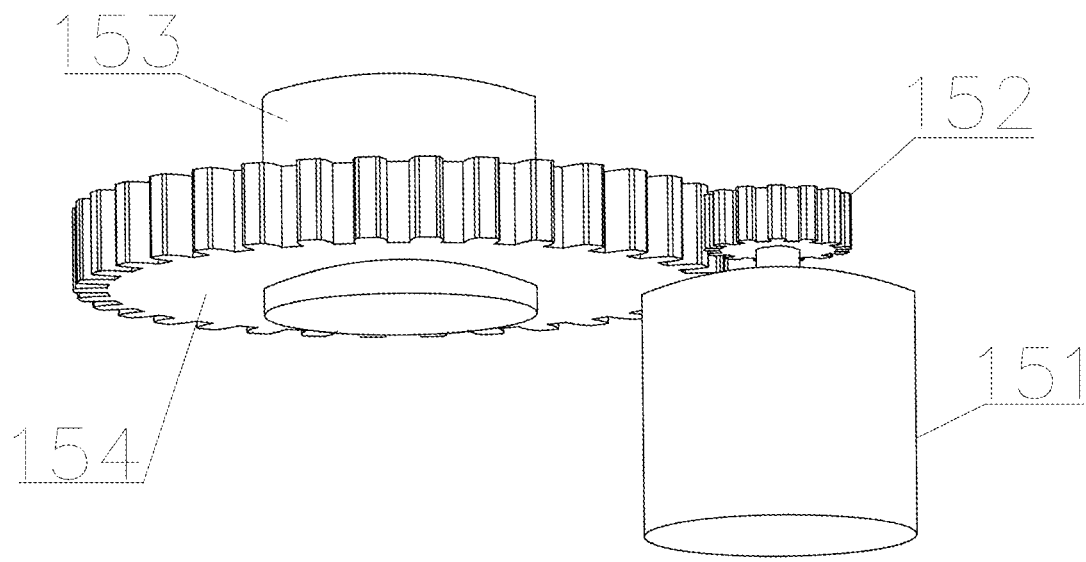
FIG. 6 is a schematic structural diagram of a rotation driving mechanism A in the base.
Figure 7:
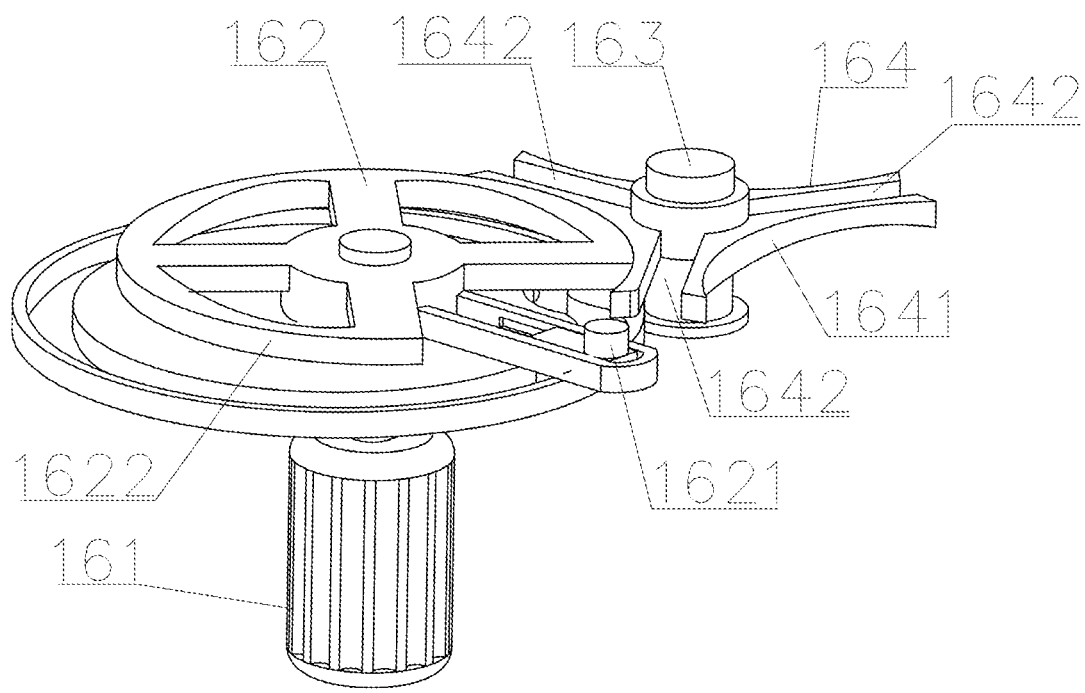
FIG. 7 is a schematic structural diagram of a rotation driving mechanism B in the base.
Figure 8:
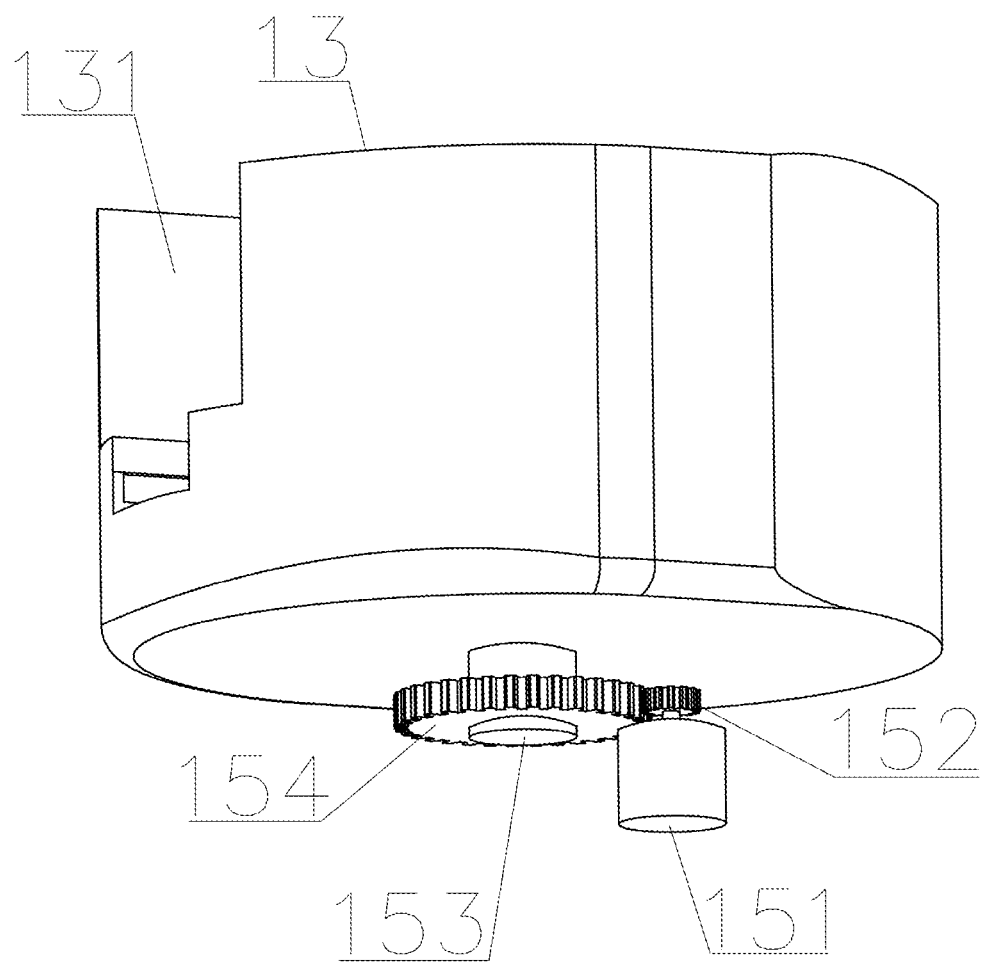
FIG. 8 is a schematic diagram of an installation position of a rotation driving mechanism A in the base.
Figure 9:
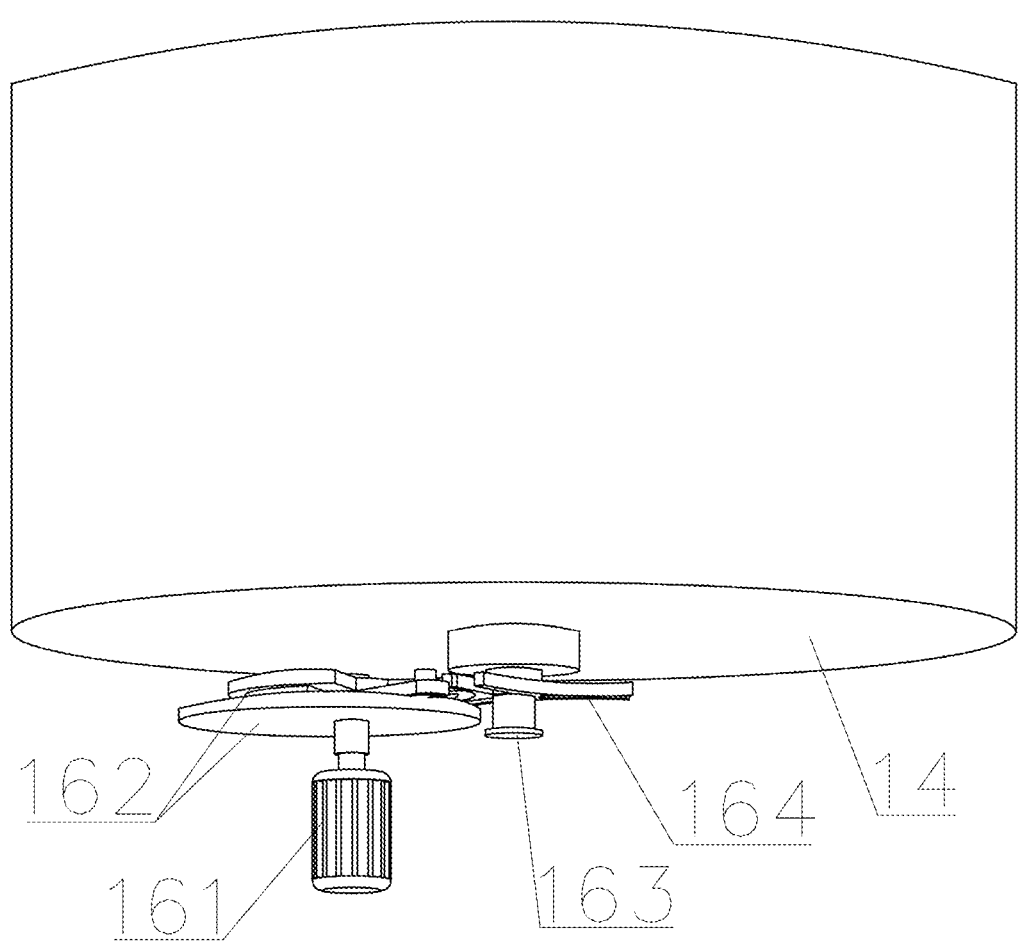
FIG. 9 is a schematic diagram of an installation position of a rotation driving mechanism B in the base.
Figure 10:
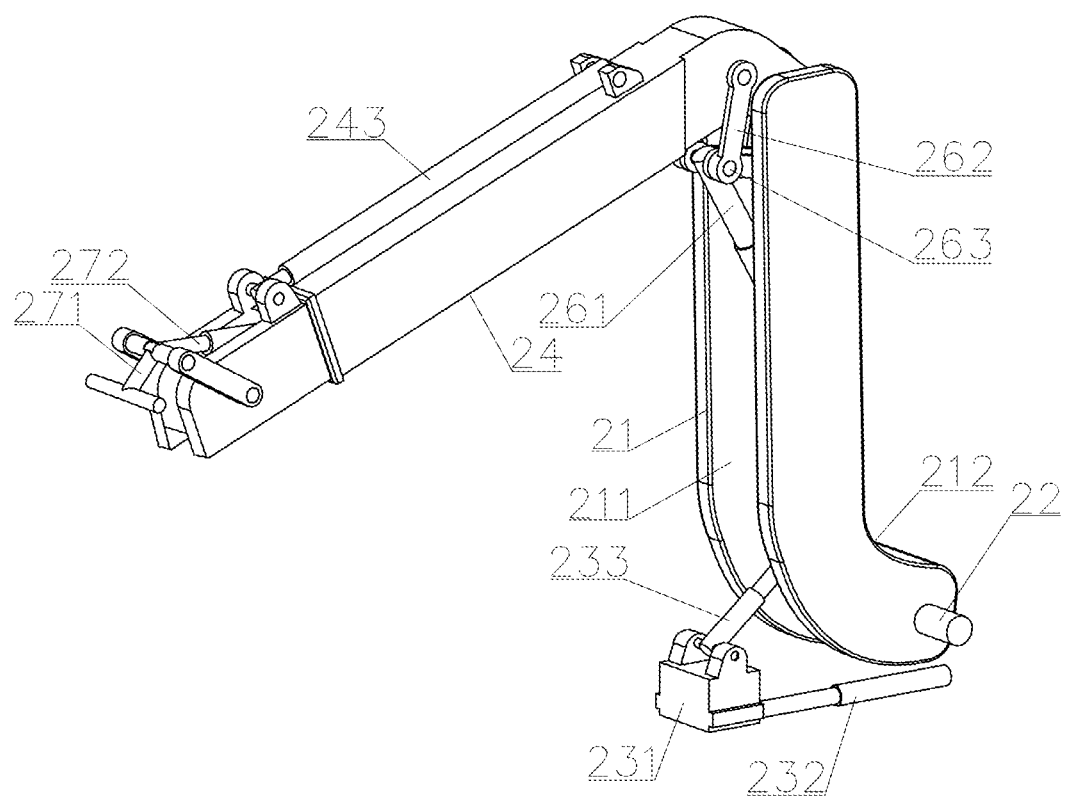
FIG. 10 is a schematic structural diagram of a mechanical arm.
Figure 11:
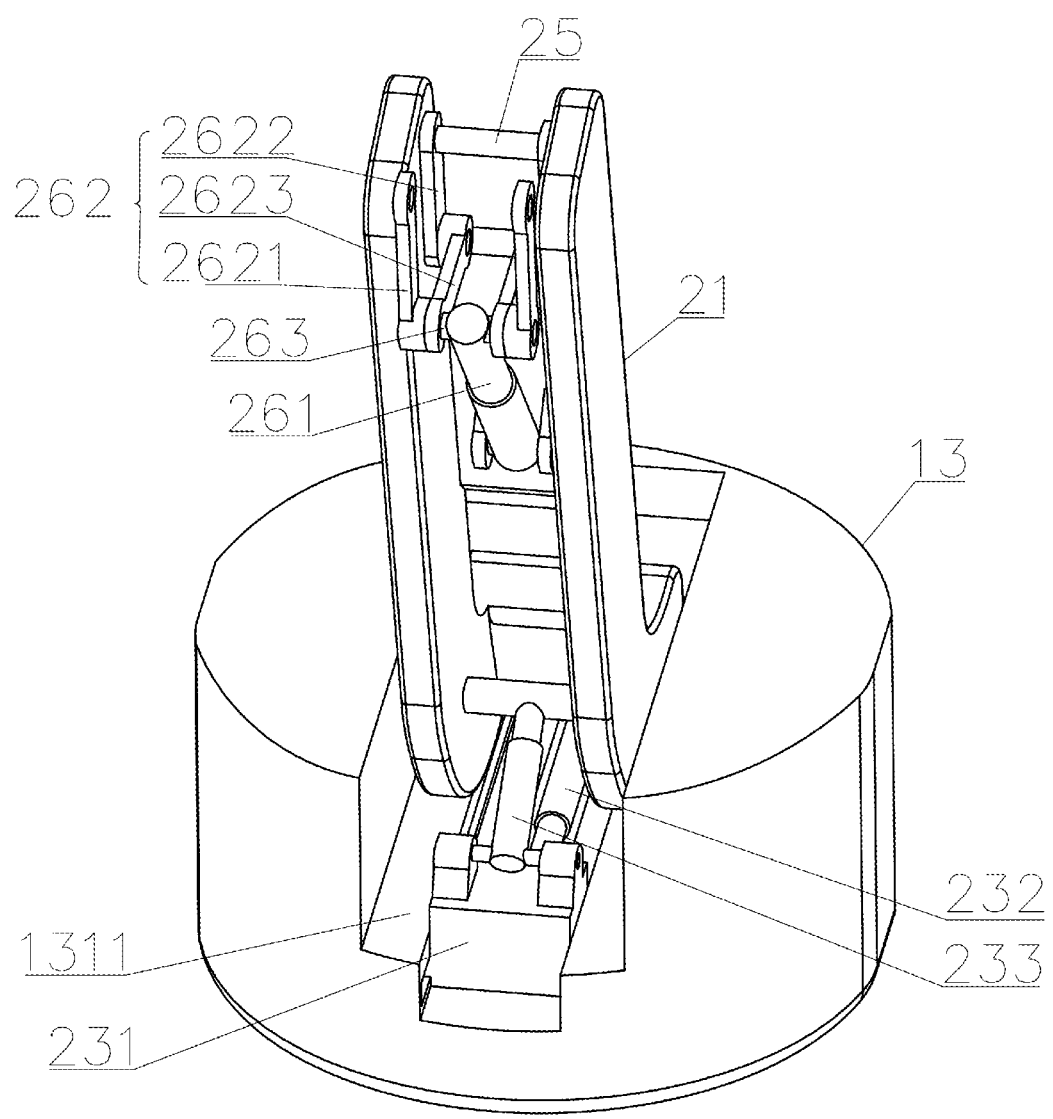
FIG. 11 is a schematic diagram of installation positions of a first rotating mechanism and a second rotating mechanism in the mechanical arm.
Figure 12:
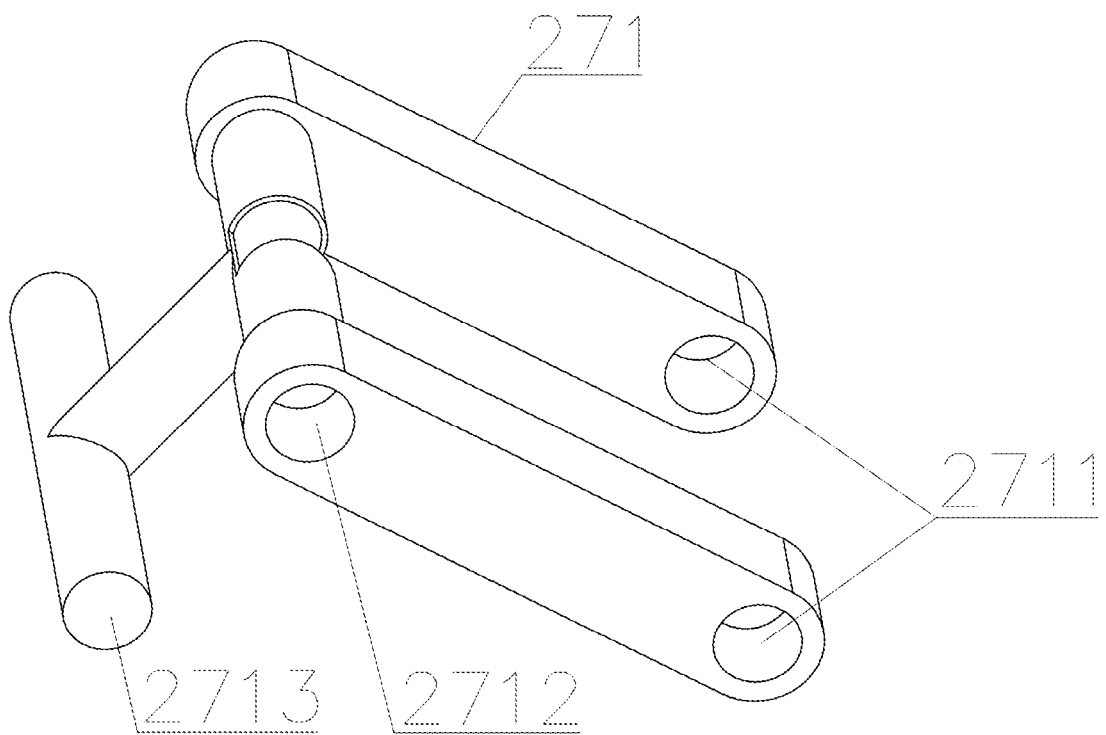
FIG. 12 is a schematic structural diagram of a connecting frame in the mechanical arm.
Figure 13:
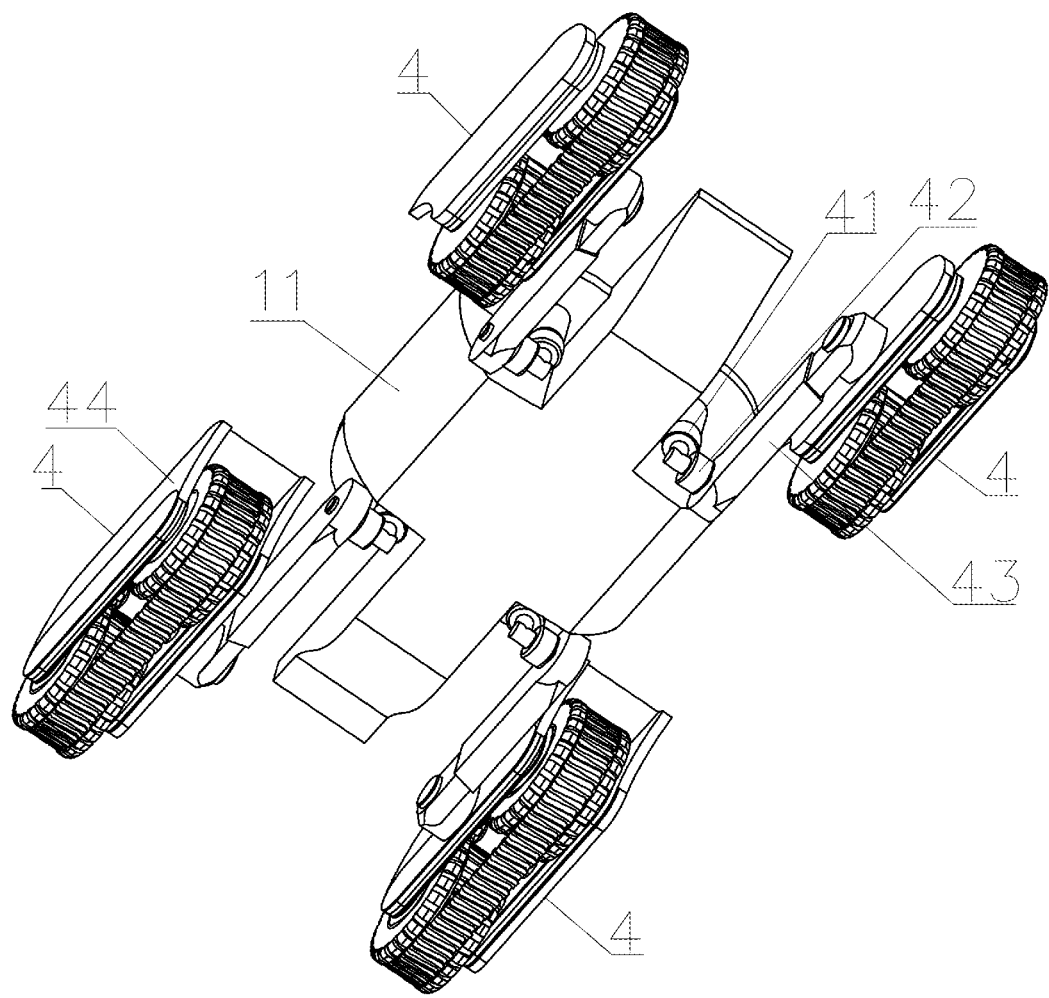
FIG. 13 is a schematic diagram of an installation position of a motion supporting device.
Figure 14:
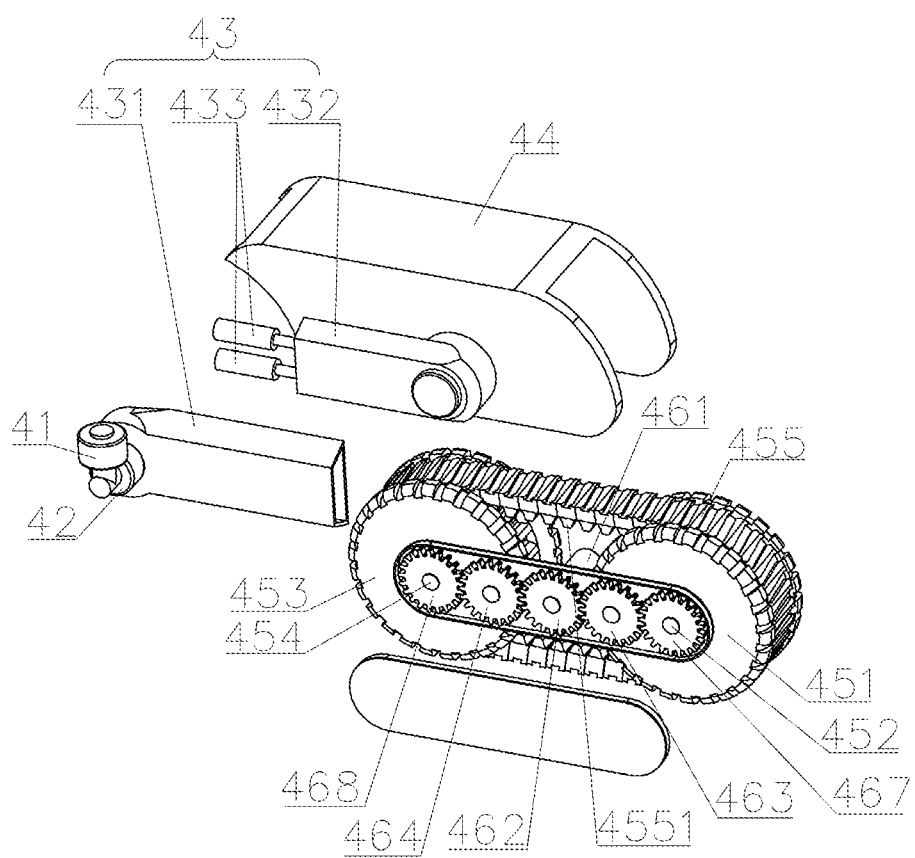
FIG. 14 is an exploded view of a motion supporting device.
Figure 15:
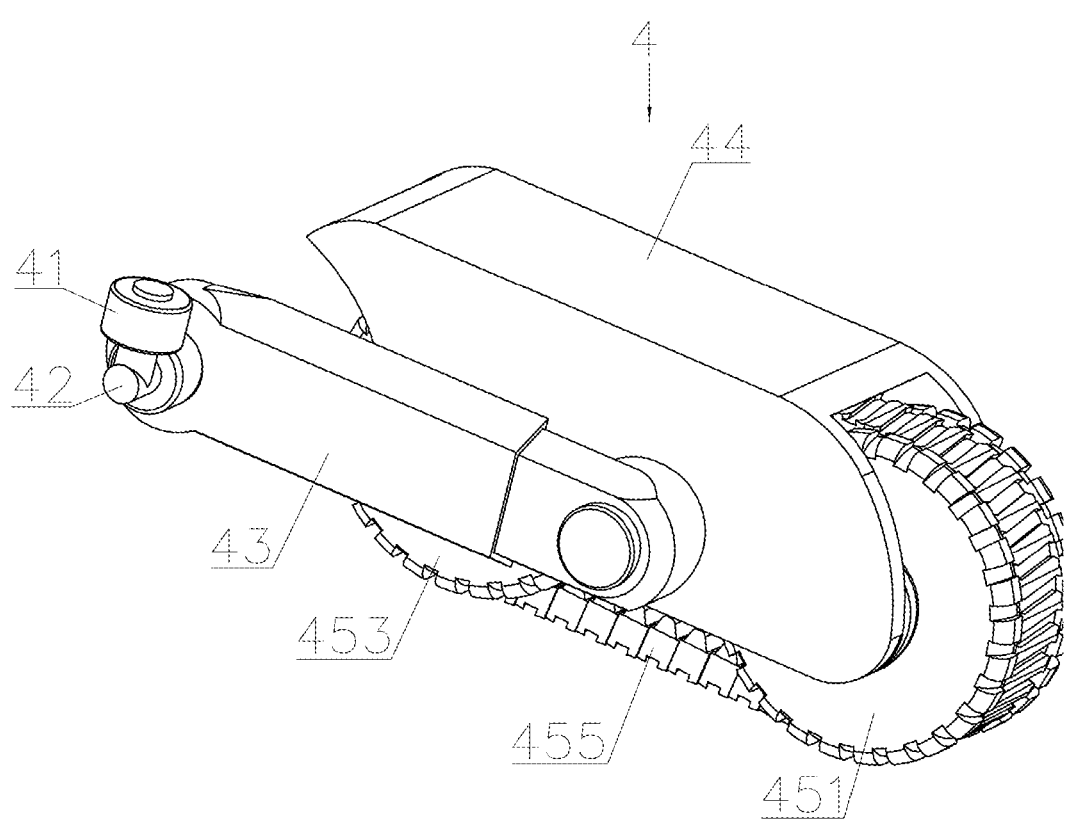
FIG. 15 is a schematic structural diagram of a motion supporting device.
Figure 16:
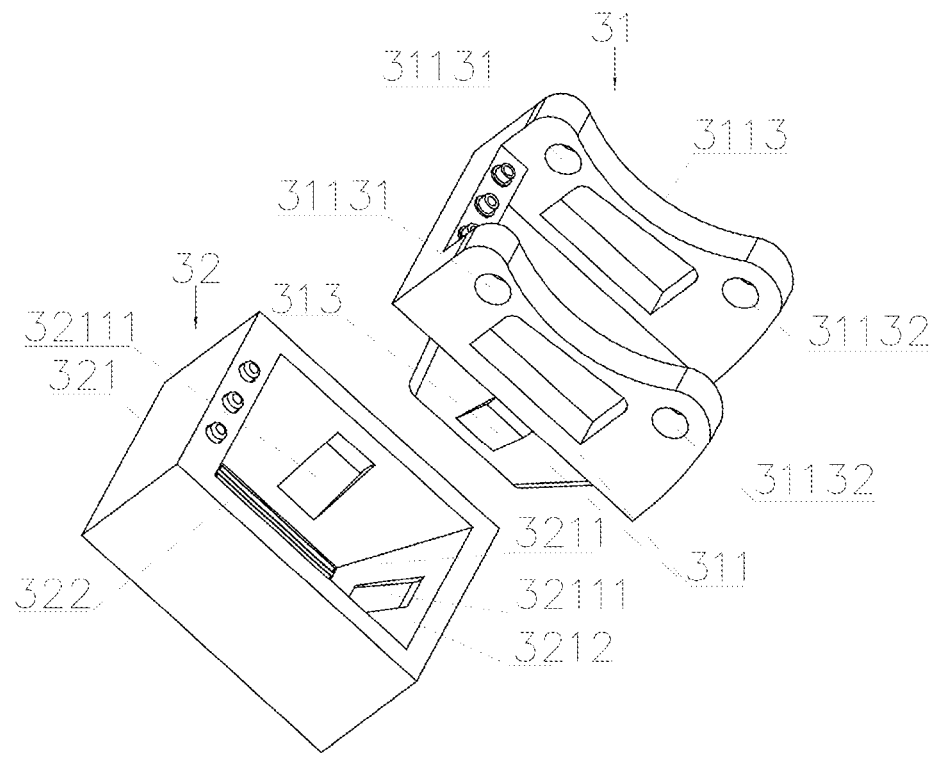
FIG. 16 is a schematic structural diagram of a tool change-over device.
Figure 17:
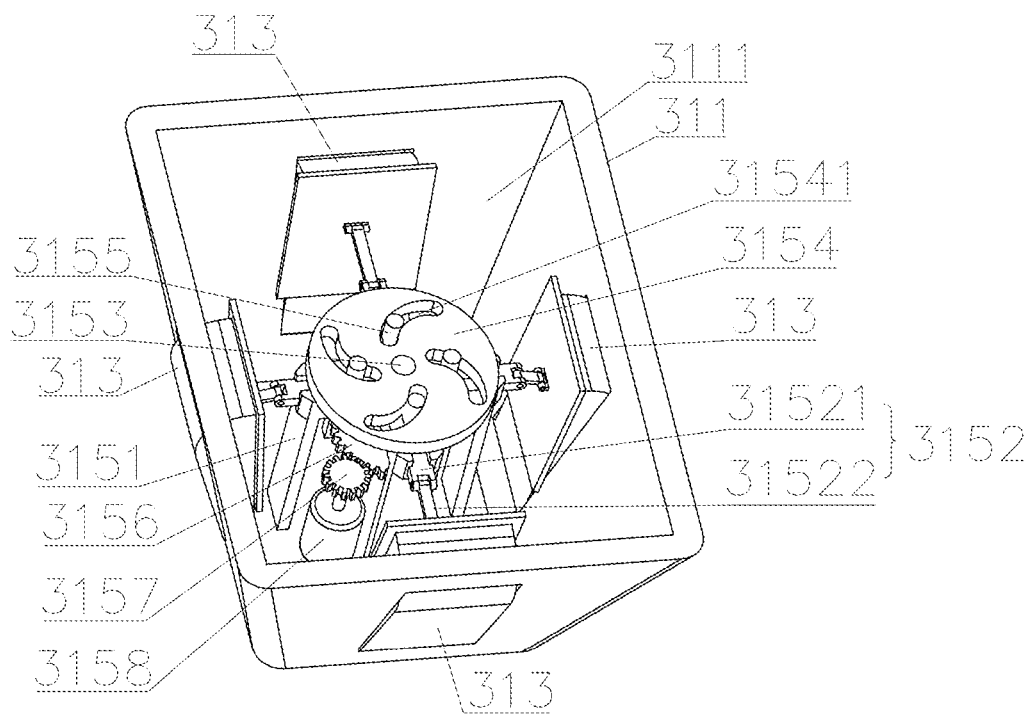
FIG. 17 is a schematic diagram of a schematic structure and an installation position of a card control mechanism in the tool change-over device.
Figure 18:
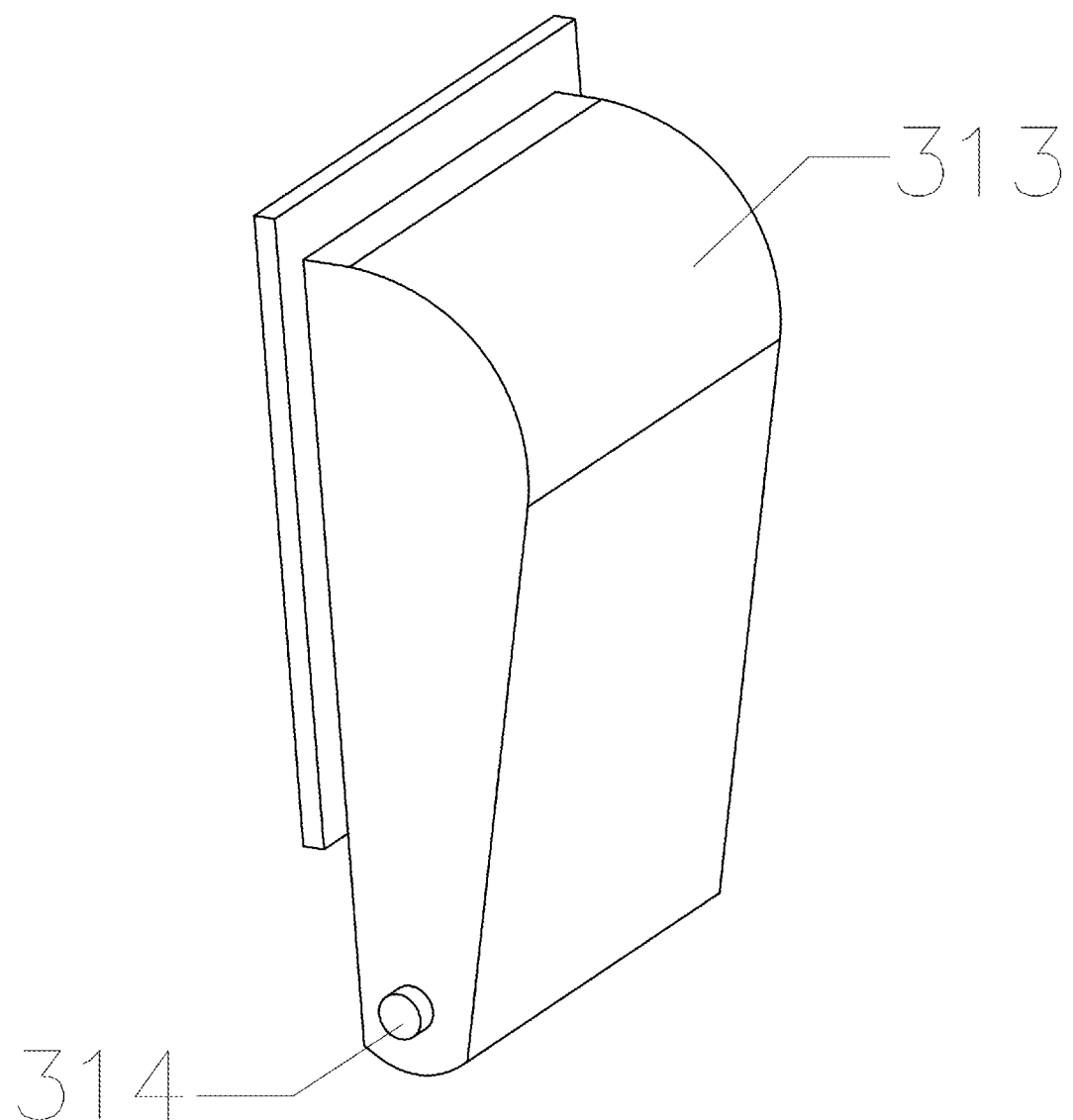
FIG. 18 is a schematic diagram of a connection relation between a card and a card rotating shaft in the tool change-over device.
Figure 19:
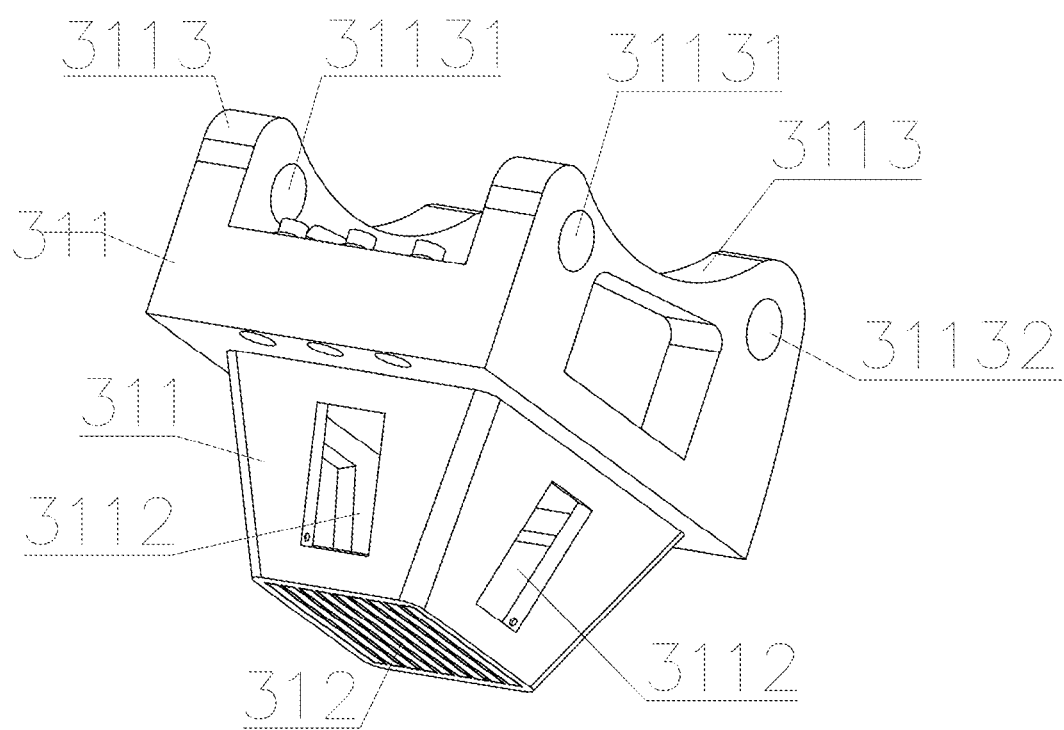
FIG. 19 is a schematic diagram of a connection relation between a shell A and an electromagnet in the tool change-over device.
Figure 20:
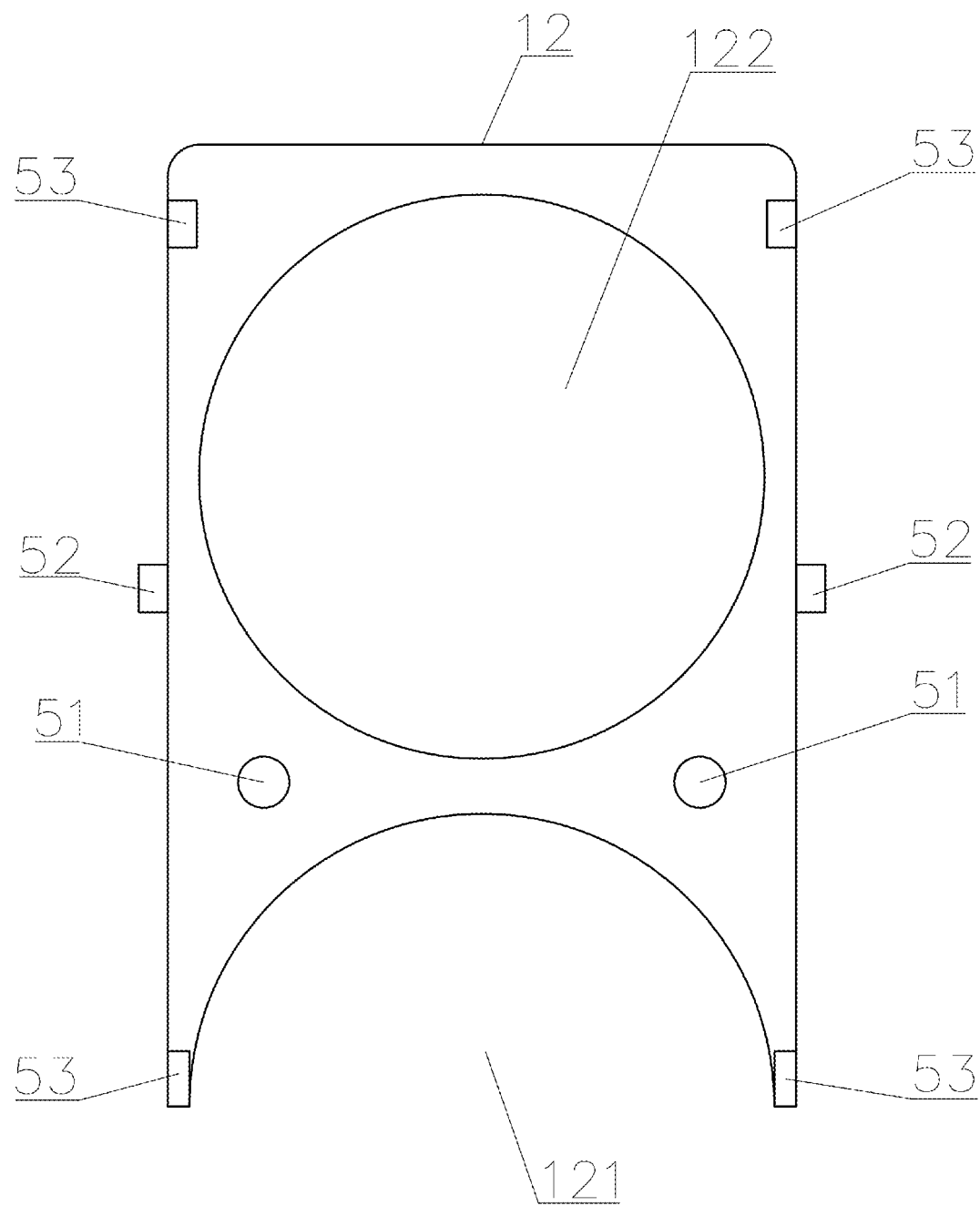
FIG. 20 is a schematic diagram of an installation position of a sensor assembly.

In the drawings: 11: pedestal; 111: motor mounting hole A; 112: motor mounting hole B; 113: mounting gap A; 12: mounting seat A; 121: front mounting region; 122: rear mounting region; 13: mounting seat B; 131: mounting gap B; 1311: sliding rail; 14: mounting seat C; 141: mounting cavity; 1411: upper placement cavity; 1412: lower placement cavity; 1413: positioning step surface; 151: motor A; 152: driving gear; 153: driving gear shaft; 154: driven gear; 161: motor B; 162: driving pin wheel; 1621: round pin; 1622: locking convex arc; 163: rotating shaft B; 164: driven sheave; 1641: locking concave arc; 1642: insertion slot;

- 21: arm A; 211: strip-shaped slot; 212: arc-shaped curved section; 22: rotating shaft A; 231: sliding block A; 232: hydraulic cylinder A; 233: hydraulic cylinder B; 24: arm B; 241: rear section rod; 242: front section rod; 243: hydraulic cylinder; 25: rotating shaft B; 261: hydraulic cylinder C; 262: diamond-shaped framework; 2621: first rod; 2622: second rod; 2623: third rod; 263: connecting rod; 271: connecting frame; 2711: first hinge part; 2712: second hinge part; 2713: third hinge part; 272: hydraulic cylinder D;
- 31: male connector; 311: shell A; 3111: accommodating cavity A; 3112: card mounting hole; 3113: connecting lug; 31131: fourth hinge part; 31132: fifth hinge part; 312: electromagnet; 313: card; 314: card rotating shaft; 3151: bracket; 31511: slideway; 3152: two-fold rod; 31521: first section; 31522: second section; 3153: gear shaft C; 3154: turntable; 3155: transmission rod; 3156: gear F; 3157: gear G; 3158: motor D; 32: female connector; 321: shell B; 3211: accommodating cavity B; 32111: card positioning pit; 3212: insertion port; 3213: mounting surface; 322: iron plate;
- 4: motion supporting device; 41: hydraulic motor A; 42: hydraulic motor B; 43: telescopic sleeve; 431: front section sleeve; 432: rear section sleeve; 433: hydraulic cylinder F; 44: supporting shell; 451: first wheel; 452: first axle; 453: second wheel; 454: second axle; 455: caterpillar band; 4551: antiskid tooth; 461: motor C; 462: gear A; 463: gear B; 464: gear C; 465: gear shaft A; 466: gear shaft B; 467: gear D; 468: gear E.
- 51: camera; 52: laser proximity sensor B; inclination sensor 53.

DETAILED DESCRIPTION OF THE EMBODIMENTS

Embodiment 1

As shown in FIG. 1 to FIG. 20, a nuclear emergency multifunctional operation robot includes a base, a mechanical arm, a tool change-over device, and motion supporting devices 4.

The base includes a pedestal 11, a mounting seat A 12, a mounting seat B 13, a mounting seat C 14, a rotation driving mechanism A, and a rotation driving mechanism B.

A motor mounting hole A 111 and a motor mounting hole B 112 are formed in the pedestal 11; both sides of the front end and both sides of the rear end of the pedestal 11 are respectively provided with mounting gaps 113 A used to mounting the motion supporting devices.

The mounting seat A 12 is fixedly mounted at the upper end of the pedestal 11, and the front and rear ends of the mounting seat A are respectively provided with a front mounting region 121 and a rear mounting region 122; the front mounting region 121 is an arc-shaped gap formed in the front end of the mounting seat A 12 and running through the mounting seat A 12 from top to bottom; and the rear mounting region 122 is a mounting hole formed in the rear end of the mounting seat A 12 and running through the mounting seat A 12 from top to bottom.

The mounting seat B 13 is movably mounted in the front mounting region 121 of the mounting seat A 12; the mounting seat B 13 is cylindrical and adapts to the radian of the front mounting region 121; a mounting gap B 131 for mounting the mechanical arm is formed in the mounting seat B; and the bottom of the mounting gap B 131 is provided with a sliding rail 1311.

The mounting seat C 14 is movably mounted in the rear mounting region 122 of the mounting seat A 12. The mounting seat C 14 is cylindrical and adapts to the pore diameter of the rear mounting region 122; three placement cavities 141 are uniformly distributed in a ring shape around a center line of the mounting seat C14; the placement cavities 141 include, from top to bottom in sequence, an upper placement cavity 1411 for placing a female connector 32 and a lower placement cavity 1412 for accommodating an end tool connected with the female connector 32; and the upper placement cavity 1411 is provided with an opening in the upper end of the mounting seat C 14.

The rotation driving mechanism A is mounted between the pedestal 11 and the mounting seat B 13 to drive the mounting seat B 13 to rotate in a horizontal direction. The rotation driving mechanism A includes a motor A 151, a driving gear 152, a driving gear shaft 153, and a driven gear 154. The motor A 151 is fixedly mounted in a motor mounting hole A 111 of the pedestal 11. The driving gear 152 is fixedly mounted on a crankshaft of the motor A 151. The driving gear shaft 153 is vertically arranged and rotatably mounted on the pedestal 11, and the upper end of the driving gear shaft is fixedly connected to the lower end of the mounting seat B 13. The driven gear 154 is fixedly mounted on the driving gear shaft 153 and is engaged with the driving gear 152. Power of the motor A 151 is transmitted to the mounting seat B 13 through the driving gear 152, the driven gear 154, and the driving gear shaft 153 to drive the mounting seat B 13 to rotate.

The rotation driving mechanism B is mounted between the pedestal 11 and the mounting seat C 14 to drive the mounting seat C 14 to rotate in the horizontal direction. The rotation driving mechanism B includes a motor B 161, a driving pin wheel 162, a rotating shaft B 163, and a driven sheave 164. The motor B 161 is fixedly mounted in a motor mounting hole B 112 of the pedestal 11. A center hole A is formed in the middle of the driving pin wheel 162; the end surface is fixedly connected with a round pin 1621; the side wall surface is provided with a locking convex arc 1622; and the driving pin wheel 162 is fixedly mounted on a crankshaft of the motor B 161 through the center hole A. The rotating shaft B 163 is vertically arranged and rotatably mounted on the pedestal 11, and the upper end of the rotating shaft B is fixedly connected to the lower end of the mounting seat C 14. A center hole B is formed in the middle of the driven sheave 164; the side wall surface is provided with three locking concave arcs 1641; the three locking concave arcs 1641 are uniformly distributed in a ring shape around the center hole B; an insertion slot 1642 for inserting the round pin 1621 is formed between adjacent locking convex arcs 1641; the driven sheave 164 is fixedly mounted on the rotating shaft B 163 through the center hole B and is fitted to the locking convex arcs 1622 of the driving pin wheel 162 through the locking concave arcs 1641. Power of the motor B 161 is transmitted to the mounting seat C 14 through the driving pin wheel 162, the driven sheave 164 and the rotating shaft B 163 to drive the mounting seat C 14 to intermittently rotate, and an angle of rotation at each time is 120 degrees.

The mechanical arm includes an arm A 21, a rotating shaft A 22, a first rotating mechanism, an arm B 24, a rotating shaft B 25, a second rotating mechanism, and an end connecting mechanism.

The arm A 21 is rotatably mounted in the mounting gap B 131 of the mounting seat B 13 at the rear end through the rotating shaft A 22. The arm A 21 is provided with a strip-shaped slot 211 for embedding part of the arm B 24; and the strip-shaped slot 211 extends from the front end of the arm A 21 to the rear end of the arm A 21.

The first rotating mechanism includes a sliding block A 231, a hydraulic cylinder A 232, and a hydraulic cylinder B 233. The sliding block A 231 is movably mounted in the sliding rail 1311 at the bottom of the mounting gap B 131. A cylinder body of the hydraulic cylinder A 232 is fixedly mounted in the mounting gap B 131 of the mounting seat B 13; a piston rod of hydraulic cylinder A 232 is connected to the sliding block A 231; the piston rod of hydraulic cylinder A 232 expands and contracts to drive the sliding block A 231 to do reciprocating movement along the sliding rail 1311. A cylinder body of the hydraulic cylinder B 233 is hinged to the sliding block A 231; a piston rod of the hydraulic cylinder B 233 is hinged to the arm A 21; and the piston rod of the hydraulic cylinder B 233 expands and contracts to drive the arm A 21 to rotate around the rotating shaft A 22.

The arm B 24 is rotatably mounted in the strip-shaped slot 211 of the front end of the arm A 21 at the rear end through the rotating shaft B 25. When the arm B 24 downwards rotates to an extreme position, the arm B may be partially embedded into the strip-shaped slot 211 of the arm A 21.

The second rotating mechanism includes a hydraulic cylinder C 261 and a four-connecting-rod mechanism. The four-connecting-rod mechanism includes two diamond-shaped frameworks 262 and one connecting rod 263. The two diamond-shaped frameworks 262 are symmetrically arranged in the strip-shaped slot 211 of the front end of the arm A 21. Each diamond-shaped framework 262 includes a first rod 2621, a second rod 2622 and a third rod 2623; the lower ends of the first rod 2621 and the second rod 2622 are respectively hinged to both ends of the third rod 2623. The upper ends of the second rods 2622 of the two diamond-shaped frameworks 262 are hinged to both ends of the rotating shaft B 25 respectively. The upper ends of the first rods 2621 of the two diamond-shaped frameworks 262 are hinged to both sides of the arm B 24. Two ends of the connecting rod 263 are respectively hinged to the hinge joints of the first rods 2621 and the third rods 2623 of two diamond-shaped frameworks 262. A cylinder body of the hydraulic cylinder C 261 and the arm A 21 are hinged and located in the strip-shaped slot 211 of the arm A 21; a piston rod of hydraulic cylinder C 261 is hinged to the connecting rod 263; the piston rod of hydraulic cylinder C 261 expands and contracts to drive the arm B 24 to rotate around the rotating shaft B 25.

The end connecting mechanism includes a connecting frame 271 and a hydraulic cylinder D 272. The connecting frame 271 is provided with a first hinge part 2711, a second hinge part 2712, and a third hinge part 2713; and the connecting frame 271 is hinged to the front end of the arm B 24 through the first hinge part 2711. A cylinder body of the hydraulic cylinder D 272 is hinged to the front end of the arm B 24; a piston rod of the hydraulic cylinder D 292 is hinged to the second hinge part 2712 of the connecting frame 271; the piston rod of the hydraulic cylinder D 272 expands and contracts to drive the connecting frame 271 to rotate around the first hinge part 2711, so that the third hinge part 2713 of the connecting frame 271 moves along an arc-shaped track.

The tool change-over device includes a male connector 31 and a female connector 32 which are abutted with or separated from each other; the male connector 31 is connected to the rear end of the arm B 24 of the mechanical arm; the female connector 32 is used to connect an end tool; and the end tool is a scraper pan, hydraulic scissors or destroy hammer.

The male connector 31 includes a shell A 311, an electromagnet 312, a card 313, a card rotating shaft 314, and a card control mechanism. An accommodating cavity A 3111 is formed in the shell A 311; the shell A 311 is provided with a card mounting hole 3112 communicating to the accommodating cavity A 3111; one end of the shell A 311 is a female connector connecting end, and the other end is a mechanical arm connecting end; the mechanical arm connecting end is provided with two oppositely disposed connecting lugs 3113; the two connecting lugs 3113 are respectively provided with fourth hinge parts 31131 and fifth hinge parts 31132; the fourth hinge parts 31131 of the two connecting lugs 3113 are opposite to each other; the fifth hinge parts 31132 of the two connecting lugs 3113 are opposite to each other; the shell A 311 is hinged to the front end of the arm B 24 through the fourth hinge parts 31131, and is hinged to the third hinge part 2713 of the connecting frame 271 through the fifth hinge parts 31132. The electromagnet 312 is fixedly mounted on the female connector connecting end of the shell A 311. The card 313 is rotatably mounted in a card mounting hole 3112 of the shell A 311 through the card rotating shaft 314; the outer side surface of the card faces the exterior of the shell A 311, and the inner side surface of the card faces the accommodating cavity A 3111 of the shell A 311. The card control mechanism is arranged in the accommodating cavity A 3111 of the shell A 311 and is associated with the card 313 to control the card 313 to rotate around the card rotating shaft 314, so that the card 313 is switched between an expanding state and a contracting state. The card 313 protrudes from an outer surface of the shell A 311 at the periphery of the card mounting hole 3112 when it is in an expanding state. The card 313 is sunken into (or flush with)

the outer surface of the shell A 311 at the periphery of the card mounting hole 3112 when it is in a contracting state.

The card control mechanism includes a bracket 3151, a two-fold rod 3152, a gear shaft C 3153, a turntable 3154, a transmission rod 3155, a gear F 3156, a gear G 3157, and a motor D 3158. The bracket 3151 is fixedly mounted at the bottom of the accommodating cavity A 3111 of the shell A 311, and a slideway 31511 is formed in the bracket. The two-fold rod 3152 includes a first section 31521 and a second section 31522 which are hinged to each other; the first section 31521 is slidably mounted in the slideway 31511 of the bracket 3151; the second section 31522 is hinged to the inner side surface of the card 313. The gear shaft C 3153 is rotatably mounted on the bracket 3151. The turntable 3154 is fixedly connected to the gear shaft C 3153 and is located at the upper end of the slideway 31511 of the bracket 3151; an arc-shaped track limiting hole 31541 is formed in the turntable. One end of the transmission rod 3155 is fixedly connected to the first section 31521 of the two-fold rod 3152, and the other end extends out from the track limiting hole 31541 of the turntable 3154. The gear F 3156 is fixedly connected to the gear shaft C 3153. The gear G 3157 is fixedly connected to the crankshaft of the motor D 3158. The motor D 3158 is fixedly mounted on the bracket 3151; power of the motor D is transmitted to the first section 31521 of the two-fold rod 3152 through the gear G 3157, the gear F 3156, the gear shaft C 3153, the turntable 3154, and the transmission rod 3155 to drive the first section 31521 of the two-fold rod 3152 to move along the slideway 31511 of the bracket 3151, so that the card 313 is pushed by the second section 31522 of the two-fold rod 3152 to rotate around the card rotating shaft 314, and the card 313 is switched between the expanding state and the contracting state.

The female connector 32 includes a shell B 321 and an iron plate 322. An accommodating cavity B 3211 is formed in the shell B 321; the accommodating cavity B 3211 adapts to the appearance of the shell A 311; a card positioning pit 32111 for embedding the card 313 that is in the expanding state is formed in the accommodating cavity B 3211; one end of the shell B 321 is provided with an insertion port 3212 communicating to the accommodating cavity 3211, and the other end is provided with a mounting surface 3213 for connecting the end tool (the end tool may be a scraper pan, hydraulic scissors or destroy hammer). The iron plate 322 is fixedly arranged at the bottom of the accommodating cavity B 3211 of the shell B 321.

When the male connector 31 is abutted with the female connector 32, the shell A 311 of the male connector 31 extends into the accommodating cavity B 3211 of the female connector 32, the card 313 of the male connector 31 is in the expanding state and embedded into the card positioning pit 32111 of the female connector 32, and the electromagnet 312 of the male connector 31 directly faces and contacts the iron plate 322 of the female connector 32.

The motion supporting devices 4 are respectively mounted in the mounting gaps A 113 on the both sides of the front end of the pedestal 11 and the mounting gaps A 113 on the both sides of the rear end. The motion supporting device 4 includes a hydraulic motor A 41, a hydraulic motor B 42, a telescopic sleeve 43, a supporting shell 44, a wheel and caterpillar band assembly and a driving assembly.

The hydraulic motor A 41 is mounted in the mounting gap A 113 of the pedestal 11, and a rotating shaft of the hydraulic motor A vertically downwards extends out.

The hydraulic motor B 42 is fixedly connected to the rotating shaft of the hydraulic motor A 41, and a rotating shaft of the hydraulic motor B extends out in the horizontal direction.

The telescopic sleeve 43 includes a front section sleeve 431, a rear section sleeve 432 and a hydraulic cylinder F 433; the front section sleeve 431 is fixedly connected to the rotating shaft of the hydraulic motor B 42; the rear section sleeve 432 and the front section sleeve 431 are movably sleeved; the hydraulic cylinder F 433 is mounted between the front section sleeve 431 and the rear section sleeve 432 to drive the telescopic sleeve 43 to expand or contract.

The supporting shell 44 is welded and fixed on the rear section sleeve 432 of the telescopic sleeve 43.

The wheel and caterpillar band assembly includes a first wheel 451, a first axle 452, a second wheel 453, a second axle 454, and a caterpillar band 455. The first wheel 451 is fixedly mounted on the first axle 452; the second wheel 453 is fixedly mounted on the second axle 454; the first axle 452 and the second axle 454 are rotatably mounted on the supporting shell 44 respectively; the caterpillar band 455 is wound between the first wheel 451 and the second wheel 453.

The driving assembly includes a motor C 461, a gear A 462, a gear B 463, a gear C 464, a gear shaft A 465, a gear shaft B 466, a gear D 467 and a gear E 468. The motor C 461 is fixedly mounted on the supporting shell 44; the gear A 462 is fixedly mounted on the crankshaft of the motor A 461; the gear B 463 and the gear C 464 are fixedly mounted on the gear shaft A 465 and the gear shaft B 466 respectively and are located on two sides of the gear A 462 and engaged with the gear A 462; the gear D 465 and the gear E 466 are fixedly mounted on the first axle 452 and the second axle 454 respectively and are engaged with the gear B 463 and the gear C 464 respectively. Power of the motor C 461 is transmitted to the gear B 463 and the gear C 464 through the gear A 462, then is transmitted to the gear D 467 and the gear E 468 respectively through the gear B 463 and the gear C 464, is transmitted to the first axle 452 and the second axle 454 respectively through the gear D 467 and the gear E 468, and then drives the first wheel 451 and the second wheel 453 respectively through the first axle 452 and the second axle 454 to rotate; and the first wheel 451 and the second wheel 453 jointly drive the caterpillar band 455 to operate.

Preferably, the upper placement cavity 1411 adapts to the outline of the female connector 32, and the lower placement cavity 1412 is used to accommodate different types of end tools. A positioning step surface 1413 is provided between the upper placement cavity 1411 and the lower placement cavity 1412. By the structure, after the female connector 32 is assembled in the placement cavity 141, the position is accurately fixed by the upper placement cavity 1411 and the positioning step surface 1413, and there is no slipping or shaking space, which is favorable for maintaining the stability of the operation robot in the traveling and operation processes.

Preferably, the axis of the placement cavity 141 tilts 8 to 12 degrees relative to a vertical plane. By the structure, the placement cavity 141 closest to the rear end of the pedestal 11 may tilt towards the front end of the pedestal 11. During change-over of the end tool, the male connector 31 may be conveniently abutted with the female connector 32 placed in the placement cavity 141 at the rear end of the pedestal 11.

Preferably, the rear end of the arm A 21 is provided with an arc-shaped curved section 212; the arc-shaped curved section 212 makes the front and rear sides of the arm A 21 respectively formed into a convex arc surface and a concave arc surface; the strip-shaped slot 211 of the arm A 21 is formed in one side surface with the convex arc surface. Due to the presence of the arc-shaped curved section 212 on the arm A 21, the front end and the rear end of the arm A 21 form an obtuse angle. When the arm A21 upwards rotates to an extreme angle, the front end of the arm A 21 is lower, so that the gravity center of the mechanical arm is lower and closer to a middle region of the operation robot. When the operation robot travels in a state of keeping the mechanical arm folded, the stability is higher.

Preferably, the arm B 24 includes the rear section rod 241, the front section rod 242, and a hydraulic cylinder E 243; the rear section rod 241 and the front section rod 242 are respectively located at the rear end and the front end of the arm B 24 and are movably sleeved with each other; a cylinder body of the hydraulic cylinder E 243 is mounted on the rear section rod 241; a piston rod of the hydraulic cylinder E 243 is mounted on the front section rod 242; and the piston rod of the hydraulic cylinder E 243 expands and contracts to drive the arm B 24 to expand or contract. The arm B 24 has a telescoping function, so that on one hand, the operation range of the operation robot can be expanded; and on the other hand, the volume of the folded mechanical arm will not be increased.

Preferably, an inner side surface of the caterpillar band 455 is provided with antiskid teeth 4551; a circle of positioning slot for embedding the caterpillar band 455 is formed in the middle parts of the outer circular surfaces of the first wheel 451 and the second wheel 452; an antiskid tooth slot for embedding the antiskid teeth 4551 is formed in the positioning slot. When the caterpillar band 455 is embedded into the positioning slot of the first wheel 451 and the second wheel 453, the outer side surface of the caterpillar band 455 is flush with the outer circular surfaces of the first wheel 451 and the second wheel 453; and the antiskid teeth 4551 on the inner side surface of the caterpillar band 455 are engaged with the antiskid tooth slot of the first wheel 451 and the second wheel 453. The positioning slot in the above-mentioned structure can avoid the caterpillar band 455 from axially slipping on the first wheel 451 and the second wheel 452. In the above-mentioned structure, the antiskid teeth are engaged with the antiskid tooth slot, which can avoid the caterpillar band 455 from slipping on the first wheel 451 and the second wheel 453.

Preferably, the shell A 311 is of a quadrangular prism shape; the axial section size from the mechanical arm connecting end to the female connector connecting end gradually decreases; and the card mounting holes 3112 are formed in the four side walls of the shell A 311. Correspondingly, the accommodating cavity B 2111 of the female connector 32 is of a quadrangular prism shape with a large upper part and a small lower part (the "upper part" here is an end close to an opening of the accommodating cavity B, and the "lower part" here is an end away from the opening of the accommodating cavity B). Four cards 313 are provided.

Preferably, the nuclear emergency multifunctional operation robot further includes a sensor assembly. The sensor assembly includes a laser proximity sensor A, a camera 51, a laser proximity sensor B 52 and an inclination sensor 53; the laser proximity sensor A (not shown in the figure) is arranged at the lower end of the pedestal 11 and is used to identify an obstacle that is higher than the ground clearance of the pedestal on a traveling route of the nuclear emergency multifunctional operation robot. The camera 51 is mounted on the mounting seat A 12 and is used to observe an environment around the nuclear emergency multifunctional operation robot and assist in changing over the end tool. The laser proximity sensors B 52 are mounted on two side walls of the mounting seat A 12 and are used to assist the nuclear emergency multifunctional operation robot in passing through a narrow space. The inclination sensors 53 are mounted on both sides of the front end and both sides of the rear end of the mounting seat A 12 and are used to detect whether the base of the nuclear emergency multifunctional operation robot is kept horizontal.

The nuclear emergency multifunctional operation robot provided by the present disclosure can fully meet use needs under a nuclear emergency scenario, and is mainly embodied by the following several functions.

I. Having the ability for passing through the narrow space. A realizing method is as follows:

S01, whether a ground obstacle exists and whether it affects the passage are determined:

a. the nuclear emergency multifunctional operation robot determines, by means of a real-time taken picture of the camera 51, whether a narrow space exists in the front in a traveling process; if there is a narrow space, the operation robot travels to an entrance of the narrow space and stops moving;

b. whether there is an obstacle that is higher than the ground clearance of the pedestal on the ground is determined in combination with detected data of the laser proximity sensor A and the real-time taken picture of the camera 51; if yes, S02 is executed; if no, S03 is executed.

Before this step starts, the nuclear emergency multifunctional operation robot travels in an initial posture. In the initial state, on the premise of ensuring that the pedestal 11 does not scratch the obstacle on the ground, the ground clearance of the pedestal is reduced to the lowest. The mounting gap B 131 on the mounting seat B 13 rotates to facing the front of the base under the driving of the rotation driving mechanism A.

At this step, the nuclear emergency multifunctional operation robot stops moving when traveling to a position 0.5 to 2 m from the entrance of the narrow space.

S02, the ground clearance of the pedestal is lifted according to the height of the obstacle on the ground;

a. the hydraulic motors B42 of the four motion supporting devices 4 are controlled to be initiated, so that the four motion supporting devices 4 respectively downward rotate around the rotating shafts of the hydraulic motors B 42 to lift the ground clearance of the pedestal; when the laser proximity sensor A detects that the ground clearance of the pedestal is higher than the obstacle on the ground, the pedestal 11 continues to be lifted by h, and the lifting is stopped; S03 is executed;

b. when the ground clearance of the pedestal is lifted to the highest through the sub-step a, the laser proximity sensor A detects that the obstacle on the ground is still higher than the ground clearance of the pedestal, the hydraulic cylinders F 433 of the four motion supporting devices 4 are controlled to extend out to drive the rear section sleeves 432 of the telescopic sleeves 43 to move towards a direction away from the front section sleeves 431, so that the telescopic sleeves 43 of the four motion supporting devices 4 to extend to further lift the ground clearance of the pedestal; when the laser proximity sensor A detects that the obstacle on the ground is lower than the ground clearance of the pedestal, the pedestal 11 continues to be lifted by h, and the lifting is stopped; S03 is executed;

c. when the pedestal 11 is lifted to the height y by the sub-step b, if the laser proximity sensor A detects that the obstacle on the ground is still higher than the ground clearance of the pedestal, an operator controls the nuclear emergency multifunctional operation robot to change the traveling route.

At this step, y=H–h, where H is the greatest height that the pedestal 11 can be lifted through the sub-step b, and h is 2 to 5 cm.

At this step, the angles of rotation of the hydraulic motors B 42 of the four motion supporting devices 4 are the same, so that the pedestal is still kept steady and horizontal after the ground clearance of the pedestal is lifted; the hydraulic motors B 42 of the four motion supporting devices 4 synchronously rotate so as to keep the pedestal steady and horizontal in the lifting process of the ground clearance of the pedestal.

At this step, extending lengths of the hydraulic cylinders F 433 of the four motion supporting devices 4 are the same, so that the pedestal is still kept steady and horizontal after the ground clearance of the pedestal is lifted; the hydraulic cylinders F 433 of the four motion supporting devices 4 synchronously extend out so as to keep the pedestal steady and horizontal in the lifting process of the ground clearance of the pedestal.

S03, the mechanical arm is folded:
  a. the arm B contracts: the piston rod of the hydraulic cylinder E 243 contracts to drive the front section rod 242 of the arm B 24 to contract into the rear section rod 241, so that the arm B 24 contracts;
  b. the arm B downward rotates: the piston rod of the hydraulic cylinder C 261 is controlled to contract, and the two diamond-shaped frameworks 262 are driven and pulled through the connecting rod 263 to synchronously deform, so as to drive the arm B 24 to downward rotate around the rotating shaft B 25; when the arm B 24 rotates to the extreme position, the piston rod of the hydraulic cylinder C 261 stops the action; at this time, a lower part of the arm B 24 is embedded into the strip-shaped slot 211 of the arm A 21;
  c. the arm A upward rotates: the piston rod of the hydraulic cylinder A 232 is controlled to contract to drive the sliding block A 231 to move along the sliding rail 1311 towards a direction close to the arm A 21, and the cylinder body of the hydraulic cylinder B 233 is driven by the sliding block A231 to move towards a direction close to the arm A 21, so that the arm A21 upward rotates around the rotating shaft A22, and the piston rod of the hydraulic cylinder B233 is then controlled to extend out to enable the arm A 21 to further upward rotate around the rotating shaft A22 till the arm A21 rotates to the extreme position;
  d. the connecting frame downward rotates: the piston rod of the hydraulic cylinder D 272 is controlled to extend out, and the connecting frame 271 is pushed to downward rotate around the first hinge part 2711, thus driving the tool change-over device and the end tool to downward rotate.

S04, whether the narrow space ahead is allowed to pass is determined:
  a. the pose of the nuclear emergency multifunctional operation robot is adjusted to make it directly face the entrance of the narrow space ahead;
  b. whether the width and the height of the entrance of the narrow space ahead allow the operation robot to pass is comprehensively determined according to the real-time taken picture of the camera 51 and the detected data of the laser proximity sensor B 52; if yes, S04 is executed; if no, the operator controls the nuclear emergency multifunctional operation robot to change the traveling route.

S05, the operation robot passes through the narrow space ahead: the operator controls the four motion supporting devices to do actions by means of the real-time taken picture of the camera 51, so that the nuclear emergency multifunctional operation robot passes through the narrow space ahead.

At this step, the actions of the motion supporting device is as follows: the motor C 461 is initiated; power of the motor C 461 is transmitted to the gear B 463 and the gear C 464 through the gear A 462, then is transmitted to the gear D 467 and the gear E 468 respectively through the gear B 463 and the gear C 464, is transmitted to the first axle 452 and the second axle 454 respectively through the gear D 467 and the gear E 468, and then drives the first wheel 451 and the second wheel 453 respectively through the first axle 452 and the second axle 454 to synchronously rotate, thus driving the caterpillar band 455 to operate.

Figure 21:
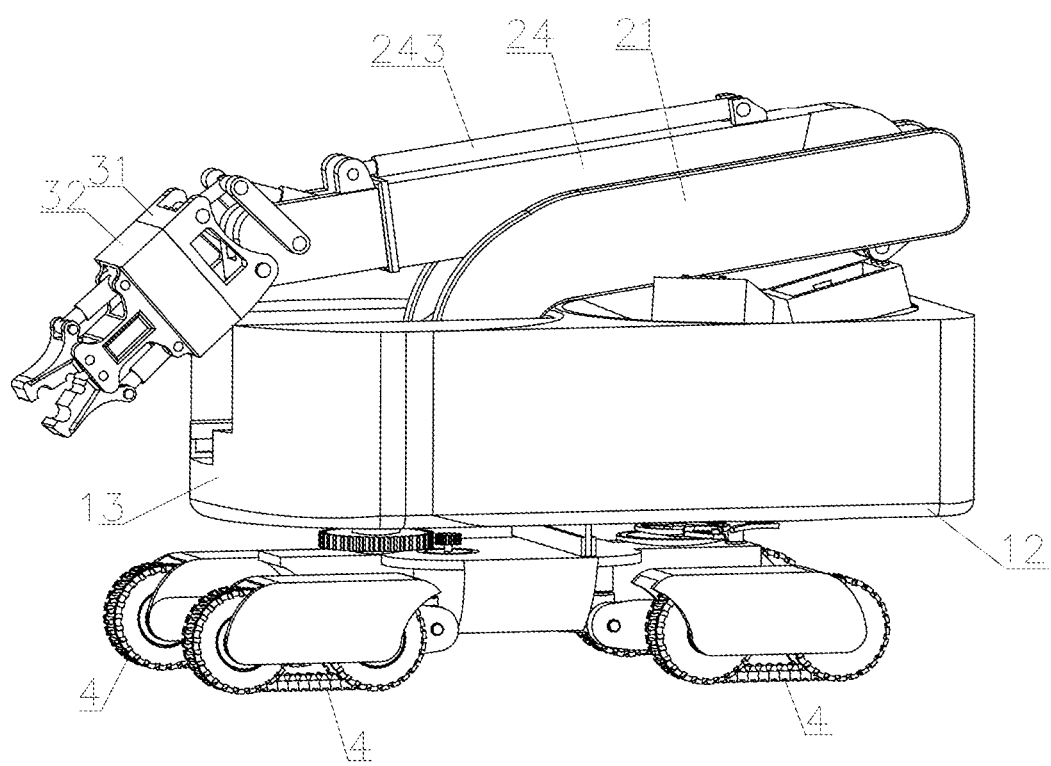
FIG. 21 is a state diagram after the present disclosure performs corresponding operations to pass through a narrow space.

Referring to FIG. 21, after the above-mentioned operations are completed, the volume of the mechanical arm is greatly reduced, and the height of the gravity center of the mechanical arm is reduced and closer to the center region of the base; the ground clearance of the pedestal is reduced to the lowest without scratching the obstacle on the ground, so that the volume and the height of the nuclear emergency multifunctional operation robot are effectively reduced, which is favorable for the nuclear emergency multifunctional operation robot to pass through the narrow space in a nuclear emergency scenario.

II. Having the ability for improving the operation stability. A realizing method is as follows:
  S01, the base is adjusted to a horizontal state: whether the base is horizontal is comprehensively determined by means of the detected data of the four inclination sensors 53; if the base is horizontal, the next step is executed; if the base is not horizontal, the motion supporting device 4 at a low-lying position is adjusted to make the base reach a horizontal state.

At this step, the method for adjusting the motion supporting device 4 is controlling the hydraulic motor B 42 to be initiated so that the motion supporting device 4 to downward rotate around the rotating shaft of the hydraulic motor B 42, so as to partially lift the pedestal 11.

S02, the position of the gravity center of the nuclear emergency multifunctional operation robot is adjusted:
  a. the motion supporting devices rotate to the outer side of the pedestal: the hydraulic motors A 41 of the four motion supporting devices 4 are initiated to respectively drive the four motion supporting devices 4 to rotate towards the outer side of the pedestal 11 around the rotating shafts of the respective hydraulic motors A 41; after the rotation is completed, the four motion supporting devices 4 are in an "X"-shaped distribution; an included angle between any two adjacent motion supporting devices 4 is 90 degrees;
  b. the motion supporting devices extend out towards the outer side of the pedestal: the piston rods of the hydraulic cylinders F 433 of the four motion supporting devices 4 extend out to respectively drive the corresponding telescopic sleeves 43 to extend; the motors C 461 of the four motion supporting devices 4 are initiated to respectively drive the corresponding wheel and caterpillar band assemblies to operate; the above-mentioned two actions are done at the same time, so that the four motion supporting devices 4 all move towards the direction away from the pedestal 11.

Figure 22:
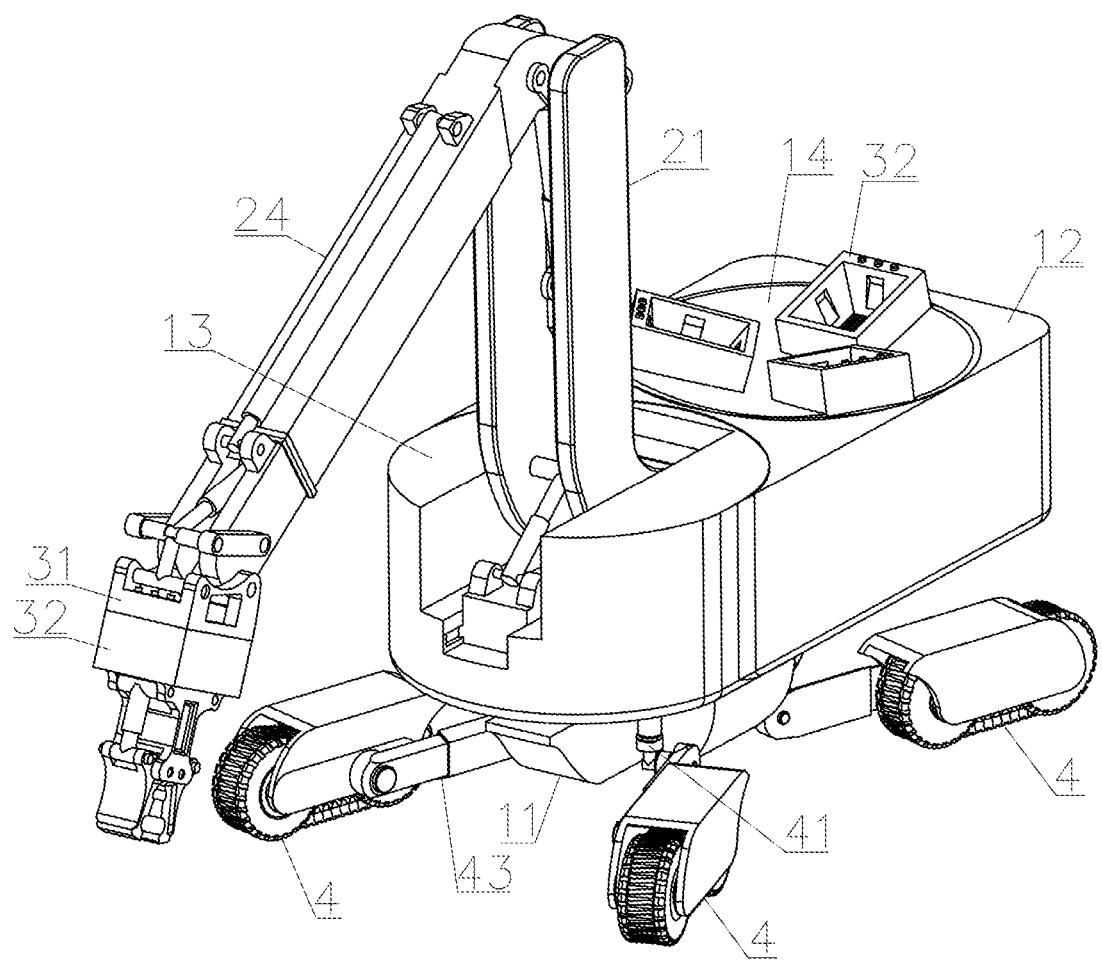
FIG. 22 is a state diagram after the present disclosure performs corresponding operations to improve the operation stability.

Referring to FIG. 22, after the above operations are completed, the inclination of the operation robot caused by a bumpy ground is corrected, so that the steadiness and the stability of the operation robot are improved; contact surfaces of the caterpillar bands 455 of the four motion supporting devices 4 with the ground all rotate towards the outer side of the pedestal 11 and extend out, so that the gravity center of the operation robot is reduced and closer to the center region of the base, which further improves the steadiness and the stability of the operation robot and avoids tipping or a tipping tendency of the operation robot due to the unstable gravity center in operation.

III. Having the ability for crossing the obstacle on the ground. An operation method is as follows:

S01, whether a ground obstacle exists and whether it affects the passage are determined:

In the traveling process of the nuclear emergency multifunctional operation robot, the laser proximity sensor A detects in real time whether an obstacle that is higher than the ground clearance of the pedestal exists on the ground ahead; if no, the robot travels normally; if yes, the robot stops moving, and S02 is executed.

At this step, the nuclear emergency multifunctional operation robot stops moving when traveling to a position 0.5 to 2 m from the obstacle on the ground.

S02, the ground clearance of the pedestal is lifted:

a. the hydraulic motors B 42 of the four motion supporting devices 4 are controlled to be initiated, so that the four motion supporting devices 4 respectively downward rotate around the rotating shafts of the hydraulic motors B 42 to lift the ground clearance of the pedestal; when the laser proximity sensor A detects that the ground clearance of the pedestal is higher than the obstacle on the ground, the pedestal 11 continues to be lifted by h, and the lifting is stopped; S03 is executed;

b. when the ground clearance of the pedestal is lifted to the highest through the sub-step a, the laser proximity sensor A detects that the obstacle on the ground is still higher than the ground clearance of the pedestal, the hydraulic cylinders F 433 of the four motion supporting devices 4 are controlled to extend out, so that the telescopic sleeves 43 of the four motion supporting devices 4 to extend to further lift the ground clearance of the pedestal; when the laser proximity sensor A detects that the obstacle on the ground is lower than the ground clearance of the pedestal, the pedestal 11 continues to be lifted by h, and the lifting is stopped; S03 is executed;

c. when the pedestal 11 is lifted to the height y by the sub-step b, if the laser proximity sensor A detects that the obstacle on the ground is still higher than the ground clearance of the pedestal, which indicates that the nuclear emergency multifunctional operation robot cannot cross the obstacle on the ground ahead, an operator controls the nuclear emergency multifunctional operation robot to change the traveling route.

At this step, y=H−h, where H is the greatest height that the pedestal 11 can be lifted through the sub-step b, and h is 2 to 5 cm.

At this step, the angles of rotation of the hydraulic motors B 42 of the four motion supporting devices 4 are the same, so that the pedestal is still kept steady and horizontal after the ground clearance of the pedestal is lifted; the hydraulic motors B 42 of the four motion supporting devices 4 synchronously rotate so as to keep the pedestal steady and horizontal in the lifting process of the ground clearance of the pedestal.

At this step, extending lengths of the hydraulic cylinders F 433 of the four motion supporting devices 4 are the same, so that the pedestal is still kept steady and horizontal after the ground clearance of the pedestal is lifted; the hydraulic cylinders F 433 of the four motion supporting devices 4 synchronously extend out so as to keep the pedestal steady and horizontal in the lifting process of the ground clearance of the pedestal.

S03, the robot crosses the obstacle on the ground: the nuclear emergency multifunctional operation robot is recovered to travel normally to cross the obstacle on the ground.

Figure 23:
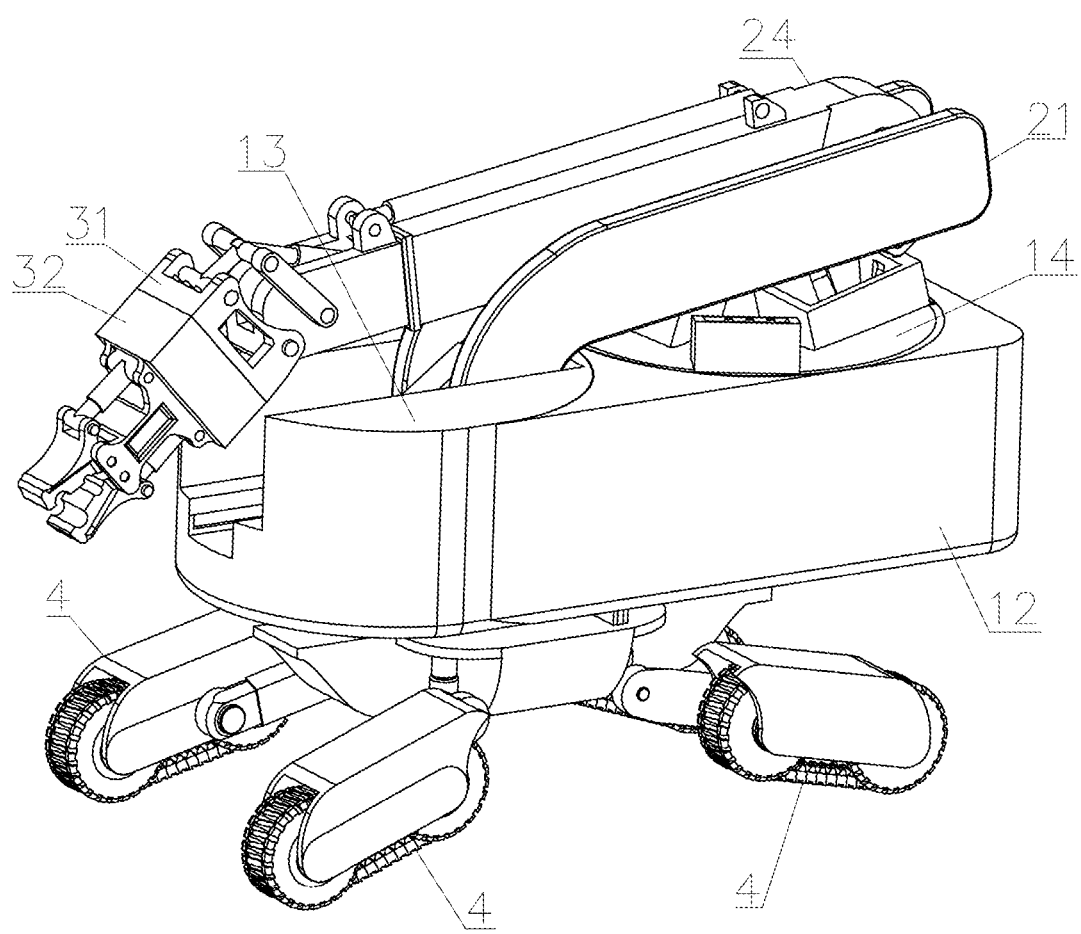
FIG. 23 is a state diagram after the present disclosure performs corresponding operations to cross a ground obstacle.

Referring to FIG. 23, after the above-mentioned operation is completed, the ground clearance of the pedestal of the nuclear emergency multifunctional operation robot is lifted, which is favorable for the nuclear emergency multifunctional operation robot to avoid the obstacle on the ground without changing the provided traveling route.

IV. Having the ability for expanding the operation range of the mechanical arm. An operation method is as follows:

S01, the motion supporting devices rotate to the outer side of the pedestal: the hydraulic motors A 41 of the four motion supporting devices 4 are simultaneously initiated to respectively drive the four motion supporting devices 4 to rotate towards the outer side of the pedestal 11 around the rotating shafts of the respective hydraulic motors A 41, so that the four motion supporting devices 4 simultaneously rotate towards the outer side of the pedestal 11; after the rotation is completed, the four motion supporting devices 4 are in an "X"-shaped distribution; an included angle between the caterpillar bands 455 of any two adjacent motion supporting devices 4 is 90 degrees.

S02, the motion supporting devices extend out towards the outer side of the pedestal: at this step, the following two actions are conducted at the same time: a. the piston rods of the hydraulic cylinders F 433 of the four motion supporting devices 4 extend out; b. the motors C 461 of the four motion supporting devices 4 are initiated to drive the four caterpillar bands 455 to operate towards the outer side of the pedestal 11; the two actions a and b work together, so that the four motion supporting devices 4 extend out towards the direction away from the pedestal 11.

S03, the ground clearance of the pedestal is lifted: the hydraulic motors B 42 of the four motion supporting devices 4 are controlled to be initiated, so that the four motion supporting devices 4 respectively downward rotate around the rotating shafts of the respective hydraulic motors B 42 to lift the ground clearance of the pedestal, thus increasing the height of the mechanical arm.

S04, the mechanical arm extends: the piston rod of the hydraulic cylinder E 243 extends out to drive the arm B 24 to extend.

Figure 24:
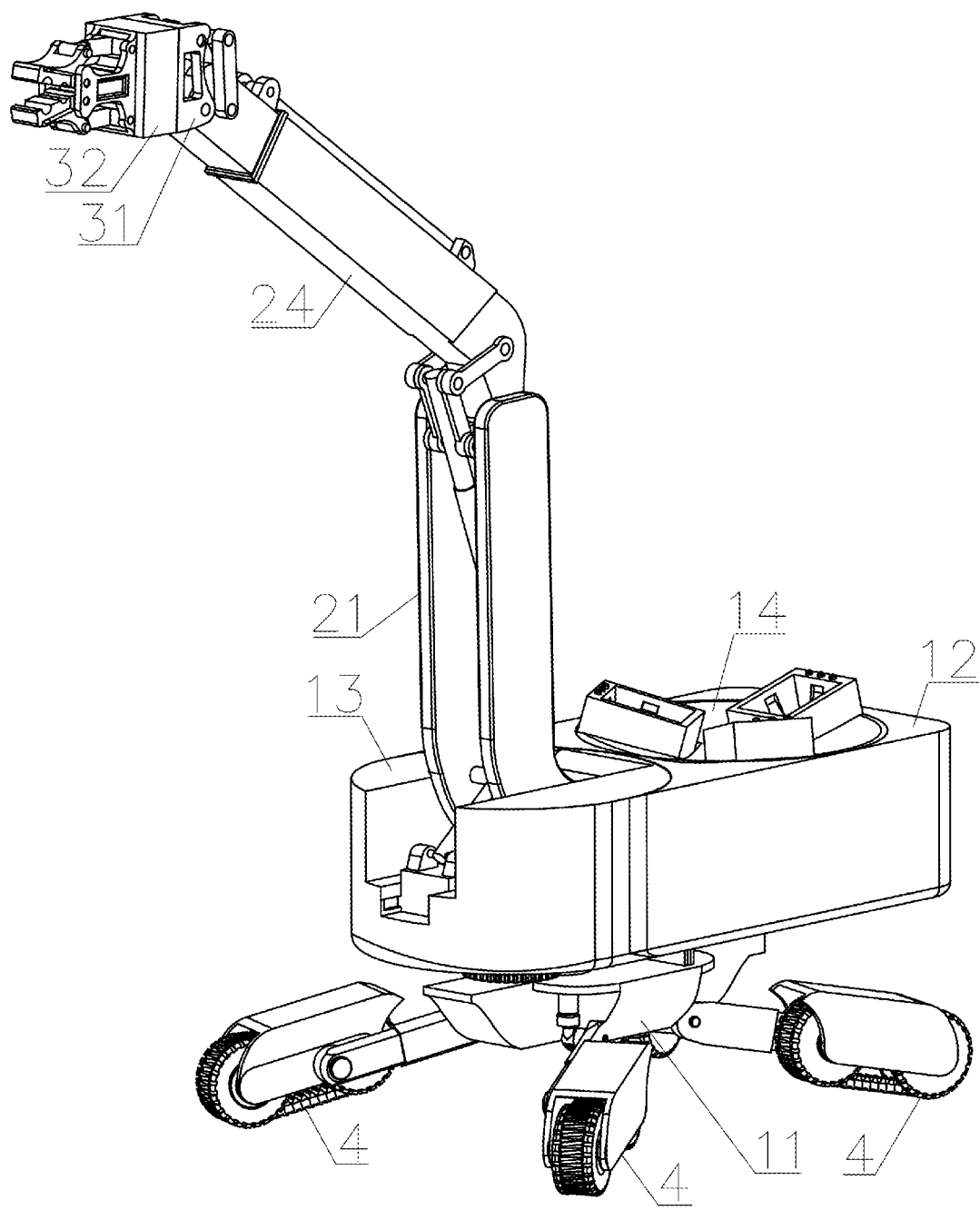
FIG. 24 is a state diagram after the present disclosure performs corresponding operations to enlarge an operation of a mechanical arm.

Referring to FIG. 24, after the above-mentioned operation is completed, the operation range of the mechanical arm of the nuclear emergency multifunctional operation robot is expanded, so that the robot can operate in a wider space, and the application range of the nuclear emergency multifunctional operation robot is expanded.

V. Having the ability for quickly changing over the end tool. An operation method is as follows:

S01, the empty placement cavity is rotated to a change-over station: when the nuclear emergency multifunctional operation robot needs to replace the end tool, the motor B 161 of the rotation driving mechanism B is controlled to be initiated to drive the mounting seat C 14 to intermittently rotate, and the target empty placement cavity 141 is rotated to a position closest to the rear end of the pedestal 11.

At this step, an angle of rotation of the mounting seat C 14 at each time is 120 degrees.

At this step, the placement cavities 141 at least include one empty placement cavity 141.

S02, the end tool to be removed is removed into the empty placement cavity:

a, the motor A 151 of the rotation driving mechanism A is controlled to be initiated to drive the mounting seat B 13 to rotate, so that the mechanical arm and the end tool to be removed are rotated to be close to the empty placement cavity 141;

b, the pose of the mechanical arm is controlled by means of the first rotating mechanism, the second rotating mechanism, and the third rotating mechanism, so that the end tool to be removed extends into the target empty placement cavity 141;

c, the motor D 3158 of the card control mechanism is controlled to be initiated to drive all the cards 313 on the male connector 31 to contract to the card mounting holes 3112, and the electromagnet 312 on the male connector 31 is controlled to be powered off, so that the female connector 32 and the male connector 31 are separated, and the female connector 32 and the end tool to be removed then fall into the target empty placement cavity 141.

At this step, the actions of the sub-steps a and b are controlled based on the real-time taken picture of the camera 51.

S03, a target end tool is connected:

a, the pose of the mechanical arm is controlled by means of the first rotating mechanism and the second rotating mechanism to increase the height of the male connector 31 to avoid the male connector 31 from interfering the rotation of the mounting seat C 14;

b, the motor B 161 of the rotation driving mechanism B is controlled to be initiated to drive the mounting seat C 14 to intermittently rotate, and the placement cavity 141 with the target end tool is rotated to the position closest to the rear end of the pedestal 11;

c, the pose of the mechanical arm is controlled by the first rotating mechanism, the second rotating mechanism and the third rotating mechanism, so that the shell A 311 of the male connector 31 extends into the accommodating cavity B 3211 of the female connector 32 connected to the target end tool;

d, the motor D 3158 of the card control mechanism is controlled to be initiated to drive all the cards 313 on the male connector 31 to extend out of the card mounting holes 3112 and be embedded into the card positioning pits 32111 of the female connector 32; the electromagnet 312 on the male connector 31 is then controlled to be electrified, so that the male connector 31 and the female connector 32 are connected into a whole;

e, the pose of the mechanical arm is controlled by means of the first rotating mechanism, the second rotating mechanism, and the third rotating mechanism, and the target end tool is taken out of the placement cavity 141.

At this step, the actions of the sub-steps a to e are controlled based on the real-time taken picture of the camera 51.

Figure 25:
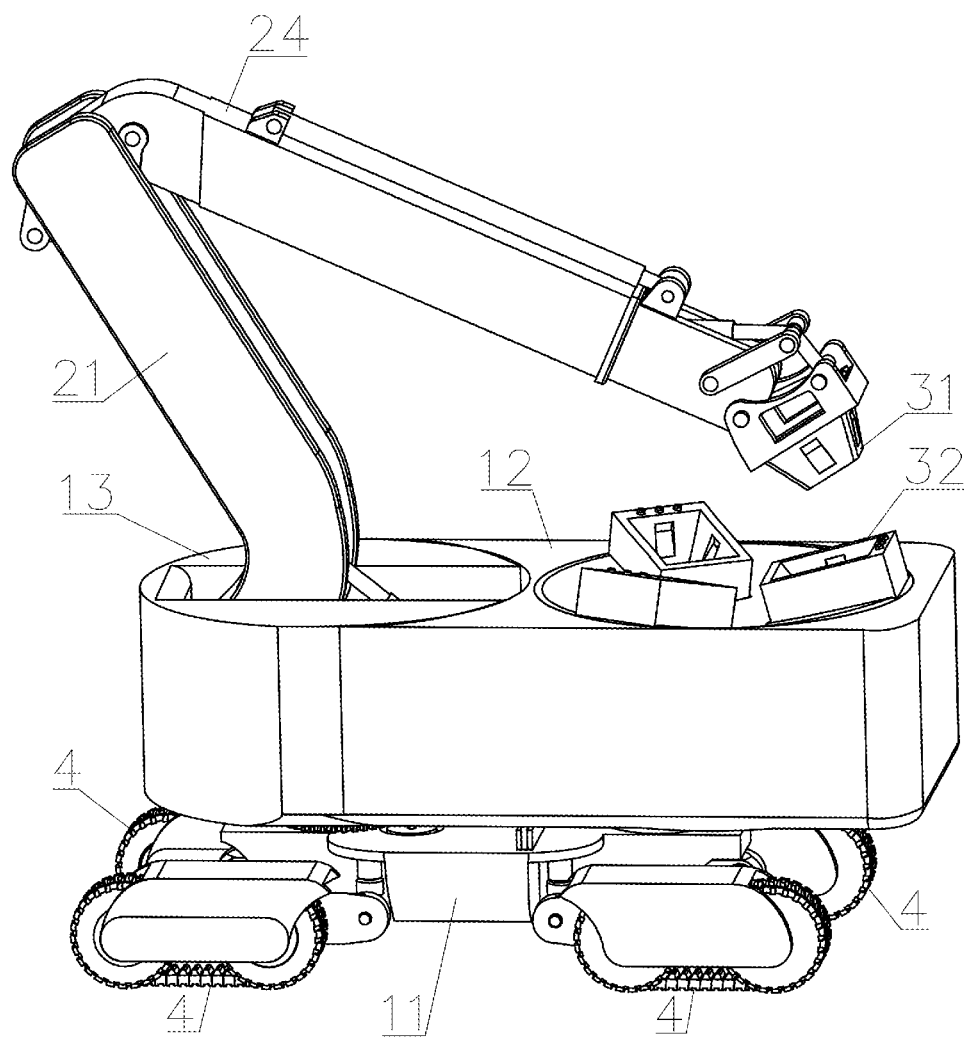
FIG. 25 is a state diagram after the present disclosure performs corresponding operations to change over an end tool.

Referring to FIG. 25, by the above-mentioned operation, the current end tool can be quickly removed, and the target end tool can be quickly assembled. The operation is simple, and the accuracy requirement is low. The operator can complete the operation under the assistance of the camera 51, so that the nuclear emergency multifunctional operation robot quickly switches various work types under the nuclear emergency scenario.

What is claimed is:

1. A multifunctional operation robot, comprising a base, a mechanical arm, a tool change-over device, and motion supporting devices, wherein the base comprises a pedestal, a mounting seat A, a mounting seat B, a mounting seat C, a rotation driving mechanism A, and a rotation driving mechanism B; the mounting seat A is fixedly mounted on an upper end of the pedestal, and the front and rear ends of the mounting seat A are respectively provided with a front mounting region and a rear mounting region; the mounting seat B and the mounting seat C are movably mounted in the front mounting region and the rear mounting region respectively; the mounting seat C is provided with a plurality of placement cavities; the rotation driving mechanism A is mounted between the pedestal and the mounting seat B to drive the mounting seat B to rotate in a horizontal direction; the rotation driving mechanism B is mounted between the pedestal and the mounting seat C to drive the mounting seat C to rotate in the horizontal direction;

the mechanical arm is movably mounted on the mounting seat B;

the tool change-over device comprises a male connector and a female connector which are either engaged or disengaged; the male connector is connected to a rear end of the mechanical arm; and the female connector is configured for connecting an end tool;

the motion supporting devices are mounted on both sides of the front end and both sides of the rear end of the pedestal and is configured to drive the nuclear emergency multifunctional operation robot to move.

2. The multifunctional operation robot according to claim 1, wherein a motor mounting hole A and a motor mounting hole B are formed in the pedestal; both sides of the front end and both sides of the rear end of the pedestal are respectively provided with mounting gaps A configured for mounting the motion supporting device;

the front mounting region of the mounting seat A is an arc-shaped gap formed in the front end of the mounting seat A and running through the mounting seat A from top to bottom; the rear mounting region of the mounting seat A is a mounting hole formed in the rear end of the mounting seat A and running through the mounting seat A from top to bottom;

the mounting seat B is cylindrical and adapts to the radian of the front mounting region; a mounting gap B for mounting the mechanical arm is formed in the mounting seat B; and a bottom of the mounting gap B has a sliding rail;

the mounting seat C is cylindrical and adapts to the pore diameter of the rear mounting region; the plurality of placement cavities comprise, from top to bottom in sequence, an upper placement cavity for placing the female connector and a lower placement cavity for accommodating the end tool connected with the female connector; the upper placement cavity has an opening in an upper end of the mounting seat C; and all of the plurality of placement cavities are uniformly distributed in a ring shape around a center line of the mounting seat C;

the rotation driving mechanism A comprises a motor A, a driving gear, a rotating shaft A, and a driven gear, wherein the motor A is fixedly mounted in the motor mounting hole A of the pedestal; the driving gear is fixedly mounted on a crankshaft of the motor A; the rotating shaft A is vertically arranged and rotatably mounted on the pedestal; the upper end of the rotating shaft A is fixedly connected to a lower end of the mounting seat B; the driven gear is fixedly mounted on the rotating shaft A and engaged with the driving gear; torque of the motor A is transmitted to the mounting seat B through the driving gear, the driven gear and the rotating shaft A to drive the mounting seat B to rotate;

the rotation driving mechanism B comprises a motor B, a driving pin wheel, a rotating shaft B and a driven sheave; the motor B is fixedly mounted in the motor mounting hole B of the pedestal; a center hole A is provided in a middle of the driving pin wheel; a round pin is fixedly connected to the end surface; a side wall surface is provided with locking convex arcs; the driving pin wheel is fixedly mounted on a crankshaft of the motor B through the center hole A; the rotating shaft B is vertically arranged and rotatably mounted on the pedestal; the upper end of the rotating shaft B is fixedly connected to a lower end of the mounting seat C; a center hole B is provided in a middle of the driven sheave; a plurality of sections of locking concave arcs are arranged on a side wall surface; all the locking concave arcs are uniformly distributed in a ring around the central hole B; an insertion slot for accommodating the round pin is arranged between adjacent locking convex arcs; the driven sheave is fixedly mounted on the shaft B through the center hole B, and is fitted with the locking convex arcs of the driving pin wheel through the locking concave arcs; torque of the motor B is transmitted to the mounting seat C through the driving pin wheel, the driven sheave and the rotating shaft B to drive the mounting seat C to intermittently rotate.

3. The multifunctional operation robot according to claim 2, wherein the mechanical arm comprises an arm A, a rotating shaft A, a first rotating mechanism, an arm B, a rotating shaft B, a second rotating mechanism, and an end connecting mechanism, wherein the arm A is rotatably mounted in the mounting gap B of the mounting seat B at a rear end of the rotating shaft A, and a strip-shaped slot is provided on the arm A, wherein the strip-shaped slot extends from a front end of the arm A to a rear end of the arm A;

the first rotating mechanism comprises a sliding block A, a hydraulic cylinder A and a hydraulic cylinder B, wherein the sliding block A is movably mounted in a sliding rail at the bottom of the mounting gap B; a cylinder body of the hydraulic cylinder A is fixedly mounted in the mounting gap B of the mounting seat B; a piston rod of hydraulic cylinder A is connected to the sliding block A, wherein the piston rod of hydraulic cylinder A expands and contracts to drive the sliding block A to do reciprocating movement along the sliding rail; a cylinder body of hydraulic cylinder B is hinged with sliding block A; a piston rod of the hydraulic cylinder B is hinged to the arm A; the piston rod of the hydraulic cylinder B expands and contracts to drive arm A to rotate around the rotating shaft A;

the arm B is rotatably mounted in the strip-shaped slot of the front end of the arm A at a rear end of the rotating shaft B;

the second rotating mechanism comprises a hydraulic cylinder C and a four-connecting-rod mechanism, wherein the four-connecting-rod mechanism comprises two diamond-shaped frameworks and one connecting rod, wherein each of the diamond-shaped frameworks comprises a first rod, a second rod and a third rod; a lower end of the first rod and a lower end of the second rod are respectively hinged to two distal ends of the third rod; the two diamond-shaped frameworks are symmetrically arranged in the strip-shaped slot of the front end of the arm A; the upper ends of the second rods of the two diamond-shaped frameworks are hinged to two distal ends of the rotating shaft B respectively; the upper ends of the first rods of the two diamond-shaped frameworks are hinged to both sides of the arm B; two ends of the connecting rod are respectively hinged to the hinge joints of the first rods and the third rods of two diamond-shaped frameworks; a cylinder body of the hydraulic cylinder C and the arm A are hinged and located in the strip-shaped slot of the arm A; a piston rod of hydraulic cylinder C is hinged to the connecting rod; the piston rod of hydraulic cylinder C expands and contracts to drive the arm B to rotate around the rotating shaft B;

the end connecting mechanism comprises a connecting frame and a hydraulic cylinder D; the connecting frame is provided with a first hinge part, a second hinge part, and a third hinge part; the connecting frame is hinged to the front end of the arm B through the first hinge part; a cylinder body of the hydraulic cylinder D is hinged to the front end of the arm B; a piston rod of the hydraulic cylinder D is hinged to the second hinge part of the connecting frame; the piston rod of the hydraulic cylinder D expands and contracts to drive the connecting frame to rotate around the first hinge part, so that the third hinge part of the connecting frame moves along an arc-shaped track.

4. The multifunctional operation robot according to claim 3, wherein the rear end of the arm A is provided with an arc-shaped curved section; the arc-shaped curved section makes the front and rear sides of the arm A respectively formed into a convex arc surface and a concave arc surface; the strip-shaped slot of the arm A is formed in one side surface with the convex arc surface; the arm B comprises a rear section rod, a front section rod, and a hydraulic cylinder E; the rear section rod and the front section rod are respectively located at the rear end and the front end of the arm B and are movably sleeved with each other; a cylinder body of the hydraulic cylinder E is mounted on the rear section rod; a piston rod of the hydraulic cylinder E is mounted on the front section rod; and the piston rod of the hydraulic cylinder E expands and contracts to drive the arm B to expand or contract.

5. The multifunctional operation robot according to claim 2, wherein the motion supporting device comprises a hydraulic motor A, a hydraulic motor B, a telescopic sleeve, a supporting shell, a wheel and caterpillar band assembly and a driving assembly, wherein the hydraulic motor A is mounted in the mounting gap A of the pedestal, and a rotating shaft of the hydraulic motor A vertically downwards extends out; the hydraulic motor B is fixedly connected to the rotating shaft of the hydraulic motor A, and a rotating shaft of the hydraulic motor B extends out in the horizontal direction; the telescopic sleeve comprises a front section sleeve, a rear section sleeve and a hydraulic cylinder F; the front section sleeve is fixedly connected to the rotating shaft of the hydraulic motor B; the rear section sleeve and the front section sleeve are movably sleeved; the hydraulic cylinder F is mounted between the front section sleeve and the rear section sleeve to drive the telescopic sleeve to expand or contract; the supporting shell is welded and fixed on the rear section sleeve; the wheel and caterpillar band assembly comprises a first wheel, a first axle, a second wheel, a second axle, and a caterpillar band; the first wheel is fixedly mounted on the first axle; the second wheel is fixedly mounted on the second axle; the first axle and the second axle are rotatably mounted on the supporting shell respectively; the caterpillar band is wound between the first wheel and the second wheel; the driving assembly comprises a motor C, a gear A, a gear B, a gear C, a gear shaft A, a gear shaft B, a gear D and a gear E; the motor C is fixedly mounted on the supporting shell; the gear A is fixedly mounted on the crankshaft of the motor A; the gear B and the gear C are fixedly mounted on the gear shaft A and the gear shaft B respectively and are located on two sides of the gear A and engaged with the gear A; the gear D and the gear E are fixedly mounted on the first axle and the second axle respectively and are engaged with the gear B and the gear C respectively.

6. The multifunctional operation robot according to claim 3, wherein the motion supporting device comprises a hydraulic motor A, a hydraulic motor B, a telescopic sleeve, a supporting shell, a wheel and caterpillar band assembly and a driving assembly, wherein the hydraulic motor A is mounted in the mounting gap A of the pedestal, and a rotating shaft of the hydraulic motor A vertically downwards extends out; the hydraulic motor B is fixedly connected to the rotating shaft of the hydraulic motor A, and a rotating shaft of the hydraulic motor B extends out in the horizontal direction; the telescopic sleeve comprises a front section sleeve, a rear section sleeve and a hydraulic cylinder F; the front section sleeve is fixedly connected to the rotating shaft of the hydraulic motor B; the rear section sleeve and the front section sleeve are movably sleeved; the hydraulic cylinder F is mounted between the front section sleeve and the rear section sleeve to drive the telescopic sleeve to expand or contract; the supporting shell is welded and fixed on the rear section sleeve; the wheel and caterpillar band assembly comprises a first wheel, a first axle, a second wheel, a second axle, and a caterpillar band; the first wheel is fixedly mounted on the first axle; the second wheel is fixedly mounted on the second axle; the first axle and the second axle are rotatably mounted on the supporting shell respectively; the caterpillar band is wound between the first wheel and the second wheel; the driving assembly comprises a motor C, a gear A, a gear B, a gear C, a gear shaft A, a gear shaft B, a gear D and a gear E; the motor C is fixedly mounted on the supporting shell; the gear A is fixedly mounted on the crankshaft of the motor A; the gear B and the gear C are fixedly mounted on the gear shaft A and the gear shaft B respectively and are located on two sides of the gear A and engaged with the gear A; the gear D and the gear E are fixedly mounted on the first axle and the second axle respectively and are engaged with the gear B and the gear C respectively.

7. The multifunctional operation robot according to claim 4, wherein the motion supporting device comprises a hydraulic motor A, a hydraulic motor B, a telescopic sleeve, a supporting shell, a wheel and caterpillar band assembly and a driving assembly, wherein the hydraulic motor A is mounted in the mounting gap A of the pedestal, and a rotating shaft of the hydraulic motor A vertically downwards extends out; the hydraulic motor B is fixedly connected to the rotating shaft of the hydraulic motor A, and a rotating shaft of the hydraulic motor B extends out in the horizontal direction; the telescopic sleeve comprises a front section sleeve, a rear section sleeve and a hydraulic cylinder F; the front section sleeve is fixedly connected to the rotating shaft of the hydraulic motor B; the rear section sleeve and the front section sleeve are movably sleeved; the hydraulic cylinder F is mounted between the front section sleeve and the rear section sleeve to drive the telescopic sleeve to expand or contract; the supporting shell is welded and fixed on the rear section sleeve; the wheel and caterpillar band assembly comprises a first wheel, a first axle, a second wheel, a second axle, and a caterpillar band; the first wheel is fixedly mounted on the first axle; the second wheel is fixedly mounted on the second axle; the first axle and the second axle are rotatably mounted on the supporting shell respectively; the caterpillar band is wound between the first wheel and the second wheel; the driving assembly comprises a motor C, a gear A, a gear B, a gear C, a gear shaft A, a gear shaft B, a gear D and a gear E; the motor C is fixedly mounted on the supporting shell; the gear A is fixedly mounted on the crankshaft of the motor A; the gear B and the gear C are fixedly mounted on the gear shaft A and the gear shaft B respectively and are located on two sides of the gear A and engaged with the gear A; the gear D and the gear E are fixedly mounted on the first axle and the second axle respectively and are engaged with the gear B and the gear C respectively.

8. The multifunctional operation robot according to claim 5, wherein an inner side surface of the caterpillar band is provided with antiskid teeth; a circle of positioning slot for embedding the caterpillar band is formed in the middle parts of the outer circular surfaces of the first wheel and the second wheel; an antiskid tooth slot for embedding the antiskid teeth is formed in the positioning slot; when the caterpillar band is embedded into the positioning slot of the first wheel and the second wheel, the outer side surface of the caterpillar band is flush with the outer circular surfaces of the first wheel and the second wheel; and the antiskid teeth on the inner side surface of the caterpillar band are engaged with the antiskid tooth slot of the first wheel and the second wheel.

9. The multifunctional operation robot according to claim 6, wherein an inner side surface of the caterpillar band is provided with antiskid teeth; a circle of positioning slot for embedding the caterpillar band is formed in the middle parts of the outer circular surfaces of the first wheel and the second wheel; an antiskid tooth slot for embedding the antiskid teeth is formed in the positioning slot; when the caterpillar band is embedded into the positioning slot of the first wheel and the second wheel, the outer side surface of the caterpillar band is flush with the outer circular surfaces of the first wheel and the second wheel; and the antiskid teeth on the inner side surface of the caterpillar band are engaged with the antiskid tooth slot of the first wheel and the second wheel.

10. The multifunctional operation robot according to claim 7, wherein an inner side surface of the caterpillar band is provided with antiskid teeth; a circle of positioning slot for embedding the caterpillar band is formed in the middle parts of the outer circular surfaces of the first wheel and the second wheel; an antiskid tooth slot for embedding the antiskid teeth is formed in the positioning slot; when the caterpillar band is embedded into the positioning slot of the first wheel and the second wheel, the outer side surface of the caterpillar band is flush with the outer circular surfaces of the first wheel and the second wheel; and the antiskid teeth on the inner side surface of the caterpillar band are engaged with the antiskid tooth slot of the first wheel and the second wheel.

11. The multifunctional operation robot according to claim 8, wherein the male connector comprises a shell A, an electromagnet, a card, a card rotating shaft, and a card control mechanism, wherein an accommodating cavity A is formed in the shell A; the shell A is provided with a card mounting hole communicating to the accommodating cavity A; one end of the shell A is a female connector connecting end, and the other end is a mechanical arm connecting end; the mechanical arm connecting end is provided with two oppositely disposed connecting lugs; the two connecting lugs are respectively provided with fourth hinge parts and fifth hinge parts; the fourth hinge parts of the two connecting lugs are opposite to each other; the fifth hinge parts of the two connecting lugs are opposite to each other; the shell A is hinged to the front end of the arm B through the fourth hinge parts, and is hinged to the third hinge part of the connecting frame through the fifth hinge parts; the electromagnet is fixedly mounted on the female connector connecting end; the card is rotatably mounted in a card mounting hole of the shell A through the card rotating shaft; the outer side surface of the card faces the exterior of the shell A, and the inner side surface of the card faces the accommodating cavity A of the shell A; the card control mechanism is arranged in the accommodating cavity A of the shell A and is associated with the card to control the card to rotate around the card rotating shaft, so that the card is switched between an expanding state and a contracting state;

the female connector comprises a shell B and an iron plate; an accommodating cavity B is formed in the shell B; the accommodating cavity B adapts to the appearance of the shell A; a card positioning pit for embedding the card that is in the expanding state is formed in the accommodating cavity B; one end of the shell B is provided with an insertion port communicating to the accommodating cavity, and the other end is provided with a mounting surface for connecting the end tool; the iron plate is fixedly arranged at the bottom of the accommodating cavity B of the shell B;

when the male connector is abutted with the female connector, the shell A of the male connector extends into the accommodating cavity B of the female connector, the card of the male connector is in the expanding state and embedded into the card positioning pit of the female connector, and the electromagnet of the male connector directly faces and contacts the iron plate of the female connector.

12. The multifunctional operation robot according to claim 9, wherein the male connector comprises a shell A, an electromagnet, a card, a card rotating shaft, and a card control mechanism, wherein an accommodating cavity A is formed in the shell A; the shell A is provided with a card mounting hole communicating to the accommodating cavity A; one end of the shell A is a female connector connecting end, and the other end is a mechanical arm connecting end; the mechanical arm connecting end is provided with two oppositely disposed connecting lugs; the two connecting lugs are respectively provided with fourth hinge parts and fifth hinge parts; the fourth hinge parts of the two connecting lugs are opposite to each other; the fifth hinge parts of the two connecting lugs are opposite to each other; the shell A is hinged to the front end of the arm B through the fourth hinge parts, and is hinged to the third hinge part of the connecting frame through the fifth hinge parts; the electromagnet is fixedly mounted on the female connector connecting end; the card is rotatably mounted in a card mounting hole of the shell A through the card rotating shaft; the outer side surface of the card faces the exterior of the shell A, and the inner side surface of the card faces the accommodating cavity A of the shell A; the card control mechanism is arranged in the accommodating cavity A of the shell A and is associated with the card to control the card to rotate around the card rotating shaft, so that the card is switched between an expanding state and a contracting state;

the female connector comprises a shell B and an iron plate; an accommodating cavity B is formed in the shell B; the accommodating cavity B adapts to the appearance of the shell A; a card positioning pit for embedding the card that is in the expanding state is formed in the accommodating cavity B; one end of the shell B is provided with an insertion port communicating to the accommodating cavity, and the other end is provided with a mounting surface for connecting the end tool; the iron plate is fixedly arranged at the bottom of the accommodating cavity B of the shell B;

when the male connector is abutted with the female connector, the shell A of the male connector extends into the accommodating cavity B of the female connector, the card of the male connector is in the expanding state and embedded into the card positioning pit of the female connector, and the electromagnet of the male connector directly faces and contacts the iron plate of the female connector.

13. The multifunctional operation robot according to claim 10, wherein the male connector comprises a shell A, an electromagnet, a card, a card rotating shaft, and a card control mechanism, wherein an accommodating cavity A is formed in the shell A; the shell A is provided with a card mounting hole communicating to the accommodating cavity A; one end of the shell A is a female connector connecting end, and the other end is a mechanical arm connecting end; the mechanical arm connecting end is provided with two oppositely disposed connecting lugs; the two connecting lugs are respectively provided with fourth hinge parts and fifth hinge parts; the fourth hinge parts of the two connecting lugs are opposite to each other; the fifth hinge parts of the two connecting lugs are opposite to each other; the shell A is hinged to the front end of the arm B through the fourth hinge parts, and is hinged to the third hinge part of the connecting frame through the fifth hinge parts; the electromagnet is fixedly mounted on the female connector connecting end; the card is rotatably mounted in a card mounting hole of the shell A through the card rotating shaft; the outer side surface of the card faces the exterior of the shell A, and the inner side surface of the card faces the accommodating cavity A of the shell A; the card control mechanism is arranged in the accommodating cavity A of the shell A and is associated with the card to control the card to rotate around the card rotating shaft, so that the card is switched between an expanding state and a contracting state;

the female connector comprises a shell B and an iron plate; an accommodating cavity B is formed in the shell B; the accommodating cavity B adapts to the appearance of the shell A; a card positioning pit for embedding the card that is in the expanding state is formed in the accommodating cavity B; one end of the shell B is provided with an insertion port communicating to the accommodating cavity, and the other end is provided with a mounting surface for connecting the end tool; the iron plate is fixedly arranged at the bottom of the accommodating cavity B of the shell B;

when the male connector is abutted with the female connector, the shell A of the male connector extends into the accommodating cavity B of the female connector, the card of the male connector is in the expanding state and embedded into the card positioning pit of the female connector, and the electromagnet of the male connector directly faces and contacts the iron plate of the female connector.

14. The multifunctional operation robot according to claim 11, wherein the shell A is of a quadrangular prism shape; the axial section size from the mechanical arm connecting end to the female connector connecting end gradually decreases; the card mounting holes are formed in the four side walls of the shell A, correspondingly, the accommodating cavity B of the female connector is of a quadrangular prism shape with a large upper part and a small lower part; and four cards are provided.

15. The multifunctional operation robot according to claim 12, wherein the shell A is of a quadrangular prism shape; the axial section size from the mechanical arm connecting end to the female connector connecting end gradually decreases; the card mounting holes are formed in the four side walls of the shell A, correspondingly, the accommodating cavity B of the female connector is of a quadrangular prism shape with a large upper part and a small lower part; and four cards are provided.

16. The multifunctional operation robot according to claim 13, wherein the shell A is of a quadrangular prism shape; the axial section size from the mechanical arm connecting end to the female connector connecting end gradually decreases; the card mounting holes are formed in the four side walls of the shell A, correspondingly, the accommodating cavity B of the female connector is of a quadrangular prism shape with a large upper part and a small lower part; and four cards are provided.

17. The multifunctional operation robot according to claim 14, wherein the card control mechanism comprises a bracket, a two-fold rod, a gear shaft C, a turntable, a transmission rod, a gear F, a gear G, and a motor D, wherein the bracket is fixedly mounted at the bottom of the accommodating cavity A of the shell A, and a slideway is formed in the bracket; the two-fold rod comprises a first section and a second section which are hinged to each other; the first section is slidably mounted in the slideway of the bracket; the second section is hinged to the inner side surface of the card; the gear shaft C is rotatably mounted on the bracket; the turntable is fixedly connected to the gear shaft C and is located at the upper end of the slideway of the bracket; an arc-shaped track limiting hole is formed in the turntable; one end of the transmission rod is fixedly connected to the first section of the two-fold rod, and the other end extends out from the track limiting hole of the turntable; the gear F is fixedly connected to the gear shaft C; the gear G is fixedly connected to the crankshaft of the motor D; the motor D is fixedly mounted on the bracket; power of the motor D is transmitted to the first section of the two-fold rod through the gear G, the gear F, the gear shaft C, the turntable, and the transmission rod to drive the first section of the two-fold rod to move along the slideway of the bracket, so that the card is pushed by the second section to rotate around the card rotating shaft, and the card is switched between the expanding state and the contracting state.

18. The multifunctional operation robot according to claim 15, wherein the card control mechanism comprises a bracket, a two-fold rod, a gear shaft C, a turntable, a transmission rod, a gear F, a gear G, and a motor D, wherein the bracket is fixedly mounted at the bottom of the accommodating cavity A of the shell A, and a slideway is formed in the bracket; the two-fold rod comprises a first section and a second section which are hinged to each other; the first section is slidably mounted in the slideway of the bracket; the second section is hinged to the inner side surface of the card; the gear shaft C is rotatably mounted on the bracket; the turntable is fixedly connected to the gear shaft C and is located at the upper end of the slideway of the bracket; an arc-shaped track limiting hole is formed in the turntable; one end of the transmission rod is fixedly connected to the first section of the two-fold rod, and the other end extends out from the track limiting hole of the turntable; the gear F is fixedly connected to the gear shaft C; the gear G is fixedly connected to the crankshaft of the motor D; the motor D is fixedly mounted on the bracket; power of the motor D is transmitted to the first section of the two-fold rod through the gear G, the gear F, the gear shaft C, the turntable, and the transmission rod to drive the first section of the two-fold rod to move along the slideway of the bracket, so that the card is pushed by the second section to rotate around the card rotating shaft, and the card is switched between the expanding state and the contracting state.

19. The multifunctional operation robot according to claim 16, wherein the card control mechanism comprises a bracket, a two-fold rod, a gear shaft C, a turntable, a transmission rod, a gear F, a gear G, and a motor D, wherein the bracket is fixedly mounted at the bottom of the accommodating cavity A of the shell A, and a slideway is formed in the bracket; the two-fold rod comprises a first section and a second section which are hinged to each other; the first section is slidably mounted in the slideway of the bracket; the second section is hinged to the inner side surface of the card; the gear shaft C is rotatably mounted on the bracket; the turntable is fixedly connected to the gear shaft C and is located at the upper end of the slideway of the bracket; an arc-shaped track limiting hole is formed in the turntable; one end of the transmission rod is fixedly connected to the first section of the two-fold rod, and the other end extends out from the track limiting hole of the turntable; the gear F is fixedly connected to the gear shaft C; the gear G is fixedly connected to the crankshaft of the motor D; the motor D is fixedly mounted on the bracket; power of the motor D is transmitted to the first section of the two-fold rod through the gear G, the gear F, the gear shaft C, the turntable, and the transmission rod to drive the first section of the two-fold rod to move along the slideway of the bracket, so that the card is pushed by the second section to rotate around the card rotating shaft, and the card is switched between the expanding state and the contracting state.

20. The multifunctional operation robot according to claim 1, further comprising a sensor assembly, wherein the sensor assembly comprises a laser proximity sensor A, a camera, a laser proximity sensor B and an inclination sensor, wherein the laser proximity sensor A is arranged at the lower end of the pedestal; the camera is mounted on the mounting seat A; the laser proximity sensors B are mounted on two side walls of the mounting seat A; and the inclination sensors are mounted on both sides of the front end and both sides of the rear end of the mounting seat A.

\* \* \* \* \*